US012650806B2

(12) United States Patent　　　(10) Patent No.: US 12,650,806 B2
Beckhardt et al.　　　　　　　　　(45) Date of Patent: Jun. 9, 2026

(54) MULTICHANNEL CONTENT DISTRIBUTION

(71) Applicant: Sonos, Inc., Santa Barbara, CA (US)

(72) Inventors: Steven Beckhardt, Santa Barbara, CA (US); Ted Lin, Ayer, MA (US); Luis R. Vega Zayas, Arlington, MA (US)

(73) Assignee: Sonos, Inc., Goleta, CA (US)

( * ) Notice: Subject to any disclaimer, the term of this patent is extended or adjusted under 35 U.S.C. 154(b) by 173 days.

(21) Appl. No.: 18/478,063

(22) Filed: Sep. 29, 2023

(65) Prior Publication Data

US 2024/0111485 A1　　Apr. 4, 2024

Related U.S. Application Data

(60) Provisional application No. 63/513,735, filed on Jul. 14, 2023, provisional application No. 63/502,347, filed on May 15, 2023, provisional application No. 63/377,967, filed on Sep. 30, 2022, provisional application No. 63/377,899, filed on Sep. 30, 2022, provisional application No. 63/377,948, filed on Sep. 30, 2022, provisional application No. 63/377,978, filed on Sep. 30, 2022, provisional application No. 63/377,979, filed on Sep. 30, 2022.

(51) Int. Cl.
　　*H04B 5/00*　　　(2024.01)
　　*G06F 3/16*　　　(2006.01)
　　*H04B 3/00*　　　(2006.01)
(52) U.S. Cl.
　　CPC ................................... *G06F 3/165* (2013.01)
(58) Field of Classification Search
　　CPC ....................................................... G06F 3/165
　　USPC ................................................. 381/8, 77, 80
　　See application file for complete search history.

(56) References Cited

U.S. PATENT DOCUMENTS 5,440,644 A　　8/1995　Farinelli et al.
5,761,320 A　　6/1998　Farinelli et al.
　　　　　　　　(Continued)

FOREIGN PATENT DOCUMENTS

EP　　　　1389853 A1　　2/2004
WO　　　200153994　　　7/2001
WO　　2003093950 A2　11/2003

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
(Continued)

*Primary Examiner* — Ammar T Hamid
(74) *Attorney, Agent, or Firm* — Akerman LLP

(57)　　　　　ABSTRACT

Disclosed example configurations include a playback device configured to, among other features, (i) receive reference clock timing; (ii) receive two or more data streams, where each data stream includes audio content and playback timing; (iii) for each data stream, generate sample-rate adjusted audio content for the data stream by adjusting a sample rate of at least a portion of the audio content of the data stream to compensate for a difference between a rendering clock at the playback device and the reference clock; (iv) generate a mix of the sample-rate adjusted audio content of the two or more data streams at the playback device; and (v) play the mix of the sample-rate adjusted audio content of each data stream based on a clock time of the rendering clock at the playback device and the playback timing information for each data stream.

24 Claims, 18 Drawing Sheets

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 11,178,447 | B1 * | 11/2021 | Panter .............. H04N 21/42203 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2005/0234571 | A1 * | 10/2005 | Holmes ............ G11B 20/10037 |
| 2007/0142944 | A1 | 6/2007 | Goldberg et al. |

OTHER PUBLICATIONS

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

Sonos, Inc. v. D M Holdings (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

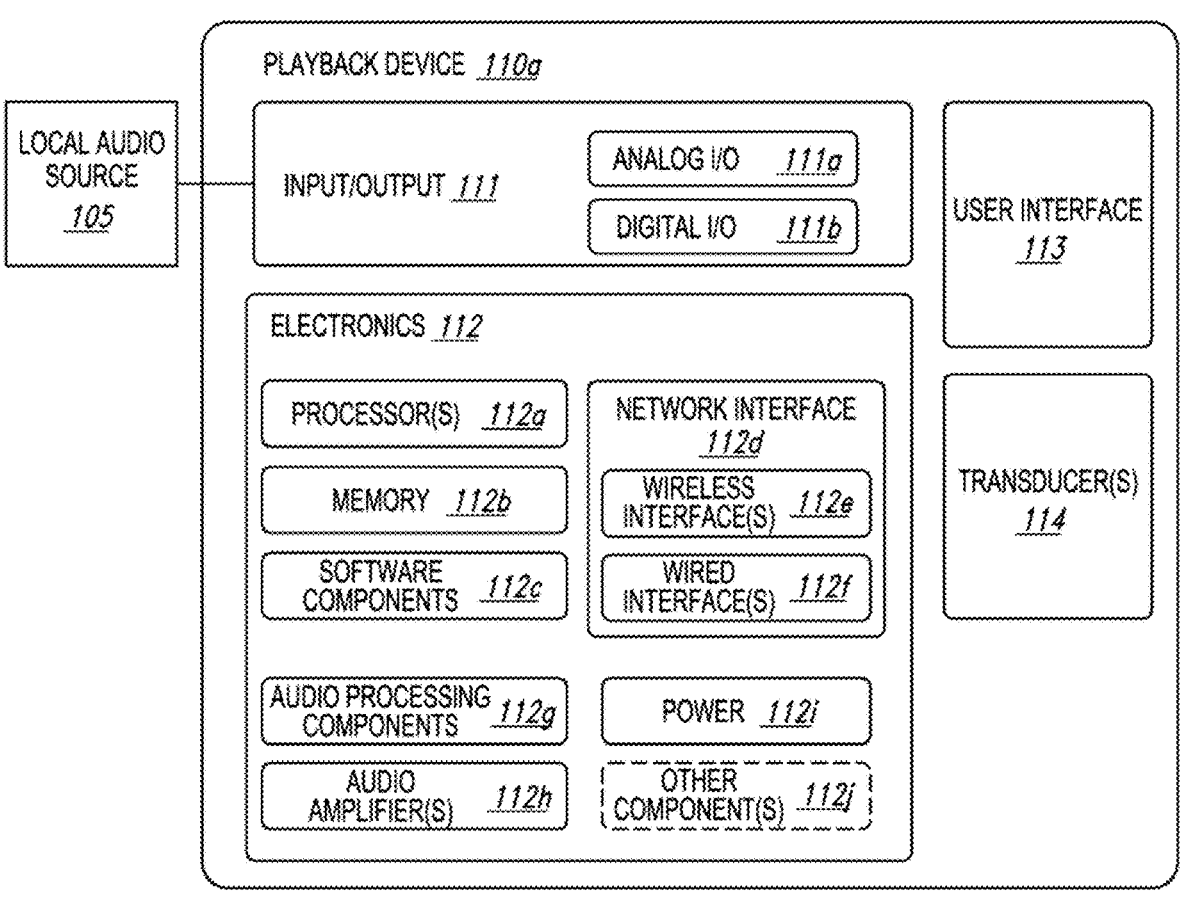
Fig. 1C
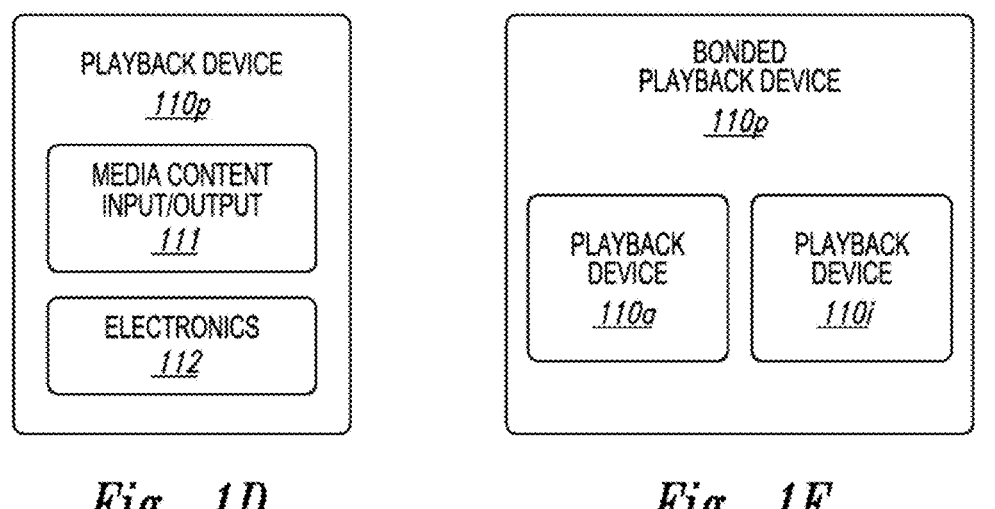
Fig. 1D          Fig. 1E

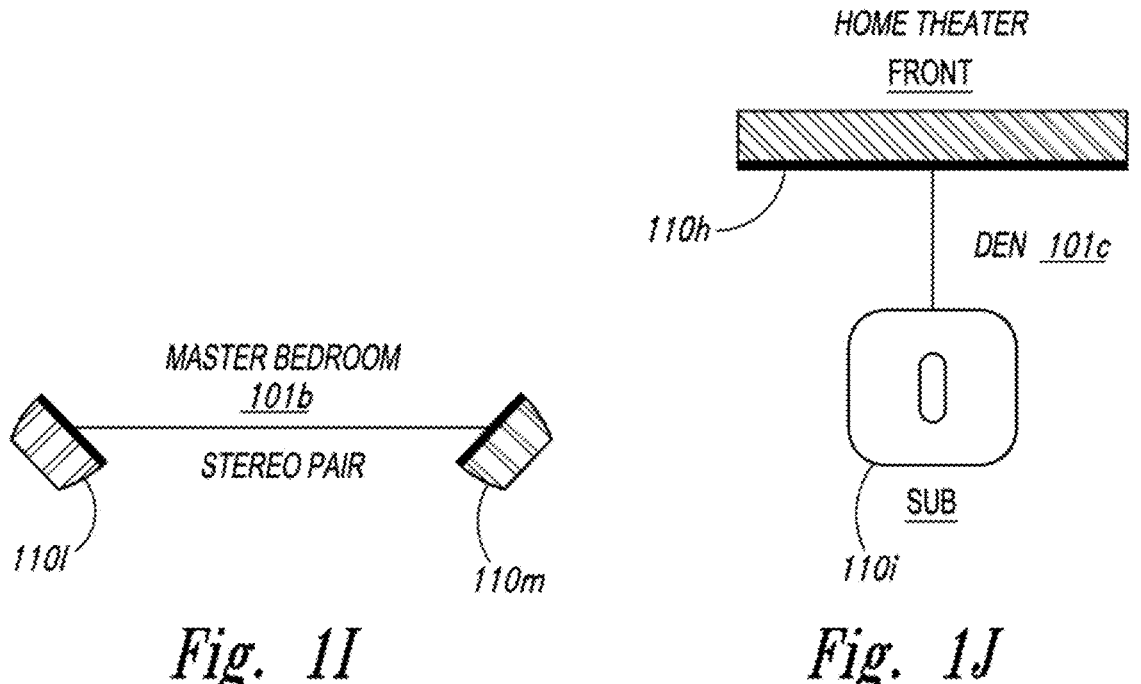
MASTER BEDROOM
*101b*
STEREO PAIR
*110l*  *110m*
*Fig. 1I*
HOME THEATER
FRONT
*110h*
DEN *101c*
SUB
*110i*
*Fig. 1J*
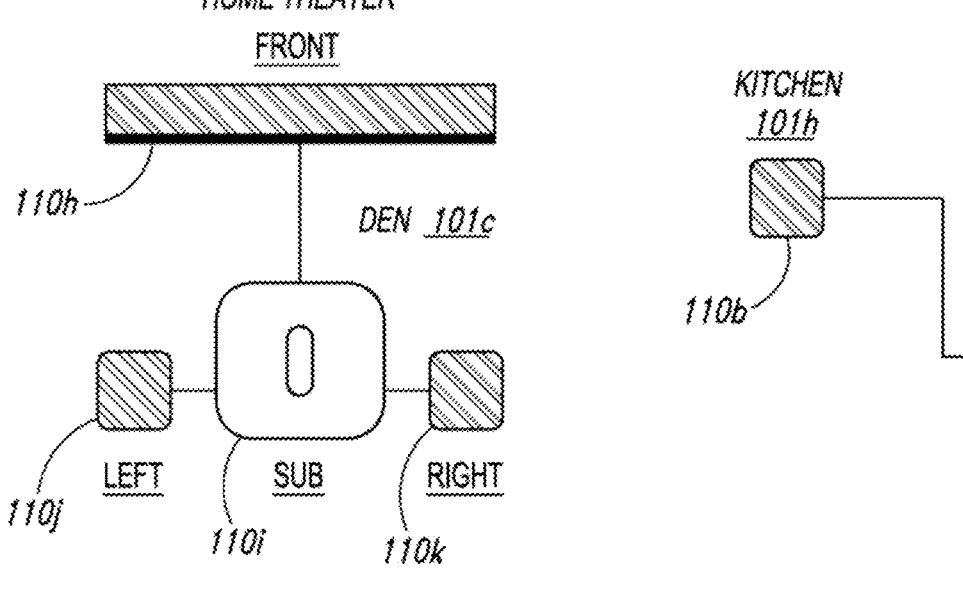
HOME THEATER
FRONT
*110h*
DEN *101c*
LEFT   SUB   RIGHT
*110j*   *110i*   *110k*
*Fig. 1K*
KITCHEN
*101h*
GROUPED
*110b*
*110d*  DINING
*101g*
*Fig. 1L*

MULTICHANNEL CONTENT DISTRIBUTION

CROSS REFERENCE TO RELATED APPLICATIONS

This application claims priority to: (i) U.S. Provisional App. 63/377,899, titled "Multichannel Content Distribution," filed on Sep. 30 2022, (ii) U.S. Provisional App. 63/377,948, titled "Playback System Architecture," (iii) U.S. Provisional App. 63/377,967, titled "Playback Systems with Dynamic Forward Error Correction," filed on Sep. 30, 2022, (iv) U.S. Provisional App. 63/377,978, titled "Broker/Subscriber Model for Information Sharing and Management Among Connected Devices," filed on Sep. 30, 2022, (v) U.S. Provisional App. 63/377,979, titled "Multiple Broker Deployment for Information Sharing and Management Among Connected Devices," filed on Sep. 30, 2022, (vi) U.S. Provisional App. 63/502,347, titled "Area Zones," filed on May 15, 2023; and (vii) U.S. Provisional App. 63/513, 735, titled "State Information Exchange Among Connected Devices," filed on Jul. 14, 2023. The entire contents of Apps. 63/377,948; 63/377,899; 63/377,967; 63/377,978; 63/377, 979; 63/502,347; 63/513,735 are incorporated herein by reference.

Aspects of the features and functions disclosed and described in the above-identified applications can be used in combination with the examples disclosed and described herein and with each other in some instances to improve the functionality and performance of playback systems including playback systems having large numbers of playback devices.

FIELD OF THE DISCLOSURE

The present disclosure is related to consumer goods and, more particularly, to methods, systems, products, features, services, and other elements directed to media playback systems, media playback devices, and aspects thereof.

BACKGROUND

Options for accessing and listening to digital audio in an out-loud setting were limited until in 2002, when SONOS, Inc. began development of a new type of playback system. Sonos then filed one of its first patent applications in 2003, titled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), individuals can play most any music they like in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C shows a block diagram of a playback device.

FIG. 1D shows a block diagram of a playback device.

FIG. 1E shows a block diagram of a network microphone device.

FIGS. 1-I through 1L show schematic diagrams of corresponding media playback system zones.

Figure 1A:
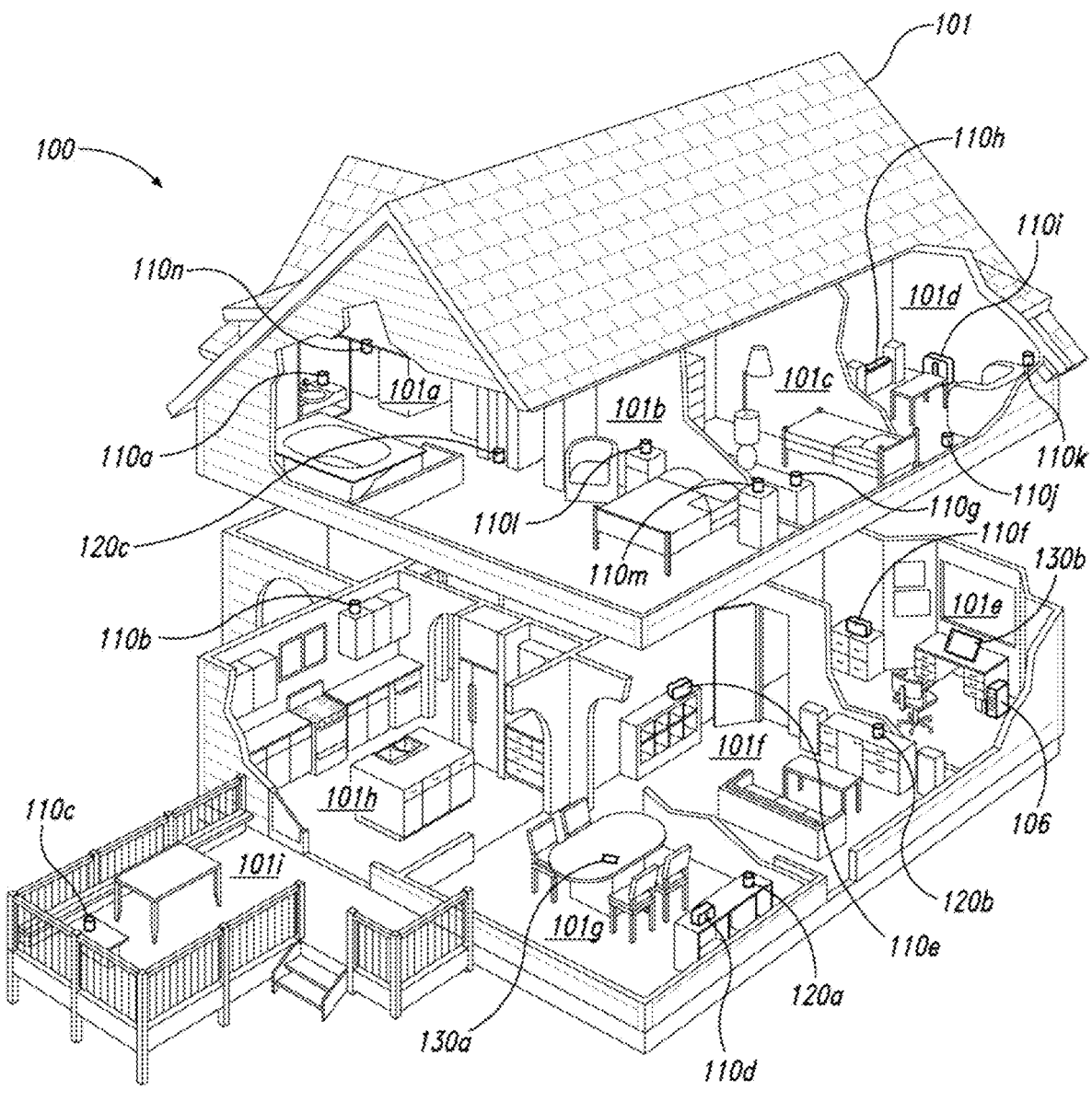
FIG. 1A shows a partial cutaway view of an environment having a media playback system configured in accordance with aspects of the disclosed technology.

The drawings are for the purpose of illustrating example configurations, but those of ordinary skill in the art will understand that the technology disclosed herein is not limited to the arrangements and/or instrumentality shown in the drawings.

DETAILED DESCRIPTION

I. Overview

Sonos's existing intelligent playback devices can be used to implement a decentralized playback system. Decentralized playback systems implemented with Sonos's existing intelligent playback devices have tremendous flexibility in terms of configuration options and ability to play many different types of audio content, thereby enabling many different playback system configurations for many different types of listening environments. However, some aspects of the flexibility result in underlying technical complexity that may be unnecessary (and perhaps even undesirable) in some circumstances, including potentially when a playback system is scaled to larger and larger system implementations.

For example, one widely recognized benefit of Sonos's existing intelligent playback devices is that each playback device is capable of performing several sophisticated playback roles, including the ability to perform multiple roles concurrently. For example, such playback devices may be configurable to perform the role (among other roles/functions) of (i) a playback group coordinator that sources, processes, and distributes audio content and playback timing to one or more group members, (ii) a playback group coordinator that also plays audio content with one or more group members, (iii) a group member that plays audio content based on playback timing received from a group coordinator, (iv) a group member that sources, processes, and distributes audio content to one or more other group members, but perhaps still executes commands relayed and/or generated by a group coordinator, (v) a bonded group primary (e.g., of a stereo pair, home theater bonded pair, or another type of bonded pair/group) that may additionally concurrently function as part of another group as either a group coordinator or a group member, and/or (vi) a bonded group secondary that may additionally concurrently function as part of another group as either a group coordinator or a group member. Such playback devices may perform other roles/functions and/or combinations of roles/functions in addition to the roles/functions and combinations thereof listed above.

Although this flexibility of functionality is desirable both for configuring a playback system in many different configurations, and for updating the configuration over time as additional playback devices are added to the system and/or playback devices are relocated and/or repurposed within a playback system, this flexibility of functionality may not be necessary (or even desirable) in some implementations where playback devices are typically not relocated within the playback system and/or new playback devices are typically not added to the playback system after the initial installation, such as large scale commercial implementations (e.g., up to or perhaps more than 100 playback devices) where playback devices are typically not added or moved after installation. For example, the software required to enable an individual playback device to implement any combination of the above-described playback device roles is complicated, and downloading software for upgrading playback devices that require a large and complex set of software code can be time consuming, especially in playback systems having many playback devices where software updates must be downloaded to every playback device and every playback device must be updated individually.

Another widely recognized feature of Sonos's existing intelligent playback devices is the ability of playback groups formed from several playback devices to consistently and reliably play audio content together in a groupwise manner with each other, e.g., in synchrony with each other. One technical approach to help enable playback groups formed from such playback devices to consistently and reliably play audio content together in a groupwise manner relates to the manner in which the group coordinator of a playback group unicasts a data stream comprising audio content and playback timing for the audio content separately to each group member in the playback group. By unicasting a data stream to each group member individually, the group coordinator enables each group member to consistently and reliably receive the data stream, and importantly, enables each group member to request retransmissions of missing or corrupted packets within the data stream from the group coordinator or other playback device sourcing audio content for the playback group.

Although unicasting a separate stream to each group member enables reliable receipt of all the packets in the data stream by each group member, unicasting a separate stream to each group member becomes technically challenging for playback groups that include a large number of group members because, for example, the volume of data transmitted from the group coordinator to each of the group members grows as the total number of group members in the playback group increases. This problem is further exacerbated in scenarios where several different data streams of audio content need to be unicasted individually to many group members in a playback system.

To help ameliorate some of the technical problems that may arise with playback systems having many playback devices, some example configurations herein introduce a combination of features, including but not necessarily limited to one or more (or all) of: (i) a reference clock used by multiple playback devices within a playback system, including in some examples, a single reference clock for a playback system; (ii) distributing reference clock timing to audio sourcing devices and rendering playback devices within the playback system, including in some instances multicast distribution, and including in some instances distribution via a wired LAN infrastructure; (ii) distributing audio content to playback devices via a channelized approach that enables distribution (including multicast distribution via a wired LAN infrastructure in some instances) of several different streams of audio content to different corresponding channels, where each playback device subscribes to the individual channels (sometimes implemented as multicast groups) having the audio content that the playback device is configured to play; (iv) introducing a local mixing functionality for rendering playback devices that enables an individual rendering playback device to locally mix audio content from two or more streams of audio content and play the mixed stream, where each playback device in the playback system can play a customized mix of the audio streams based on individualized mixing instructions for the playback device; and/or (v) implementing different software applications for implementing different playback device roles in the playback system, where an individual playback device need only download and implement the software application specific to its playback role rather than having to download and implement a comparatively much larger set of software code, and where reconfiguring a playback device's playback role in the playback system can be accomplished by downloading and implementing a separate software application corresponding to the new playback role. Some aspects of the disclosed example configurations enable features that may be useful in commercial implementations in particular, such as centralized paging functionality that enable important announcements to be mixed in with playback of other audio content and played in synchrony across many rendering playback devices.

Aspects of the features and functions implemented in the example configurations disclosed herein differ from known implementations in several important ways.

For example, with respect to mixing several streams of audio content for playback, Sonos application Ser. No. 14/617,604 titled "Synchronized Audio Mixing," filed on Feb. 9, 2015, and issued as U.S. Pat. No. 9,665,341 on May 30, 2017, includes a description of scenarios (among other scenarios) where two playback devices play a mix of two audio streams. In some example configurations, the first playback device plays a first mixed audio stream "AB" (including audio stream "A" and audio stream "B") in synchrony with the second playback device playing a second mixed audio stream "BC" (including audio stream "B" and audio stream "C"). In disclosed example configurations, a third device (e.g., a mixer or another playback device): (i) generates the first mixed audio stream "AB" and provides the first mixed audio stream "AB" to the first playback device, and (ii) generates the second mixed audio stream "BC" and provides the second mixed audio stream "BC" to the second playback device. In some instances, the third device also provides timing information to the first and second playback devices to facilitate synchronous (with respect to the audio stream "B") playback of the audio streams "AB" and "BC." However, application Ser. No. 14/617,604 does not specifically describe some scenarios described herein involving instances where an individual playback device receives several separate streams of audio content and mixes those streams of audio content locally at the playback device for playback including involving individualized mixing of separate streams of audio content based on reference clock timing from a centralized reference clock and/or based on mixing instructions received from a system controller for the playback system consistent with example configurations disclosed herein. Instead of a rendering playback device receiving separate streams and then mixing those separate streams at the rendering playback device for playback, application Ser. No. 14/617,604 describes scenarios where streams are mixed before transmission to a playback device, and then the mixed stream is sent to the playback device for playback. Further, application Ser. No. 14/617,604 also does not describe playback systems that include a centralized reference clock providing reference clock timing to audio sourcing devices and rendering playback devices, audio sourcing devices configured to distribute several streams of audio content and playback timing to playback devices based at least in part on the reference clock timing, and playback devices configured to locally mix and play the audio content from the several streams based at least in part on the reference clock timing consistent with example configurations disclosed herein. The entire contents of application Ser. No. 14/617,604 are incorporated herein by reference.

As another example, with respect to paging functionality, Sonos application Ser. No. 14/997,269 titled "System Limits Based on Known Triggers," filed on Jan. 15, 2016, and issued as U.S. Pat. No. 9,898,245 on Feb. 20, 2018, explains how playback systems have become increasingly popular in homes, hotels, motels, stores, businesses, and other like environments and how in some of these environments, it is beneficial to control one or more media playback systems based on one or more external triggers, such as an alarm or siren condition. Some example configurations disclosed in application Ser. No. 14/997,269 include playback devices that are configured to mute or otherwise reduce the volume of audio content being played by a playback device when an alarm or siren is activated. However, application Ser. No. 14/997,269 does not describe a scenario where an individual playback device locally mixes a paging channel (which may include an alarm or other emergency notification) with one or more other channels of audio content in a manner consistent with example configurations disclosed herein. Application Ser. No. 14/997,269 also does not describe individual playback devices performing such individualized mixing of separate streams of audio content based on reference clock timing from a centralized reference clock and/or based on mixing instructions received from a system controller for the playback system consistent with example configurations disclosed herein. Further, application Ser. No. 14/997,269 also does not describe playback systems that include a centralized reference clock providing reference clock timing to audio sourcing devices and rendering playback devices, audio sourcing devices configured to distribute several streams of audio content and playback timing to playback devices based at least in part on the reference clock timing, and playback devices configured to locally mix and play the audio content from the several streams based at least in part on the reference clock timing consistent with example configurations disclosed herein. The entire contents of application Ser. No. 14/997,269 are incorporated herein by reference.

As yet another example, with respect to playback devices that implement limited feature sets, Sonos application Ser. No. 17/508,028 titled "Techniques for Enabling Interoperability between Media Playback Systems," filed on Oct. 22, 2021, and currently pending recognizes that it may be beneficial to interface playback devices with other Internet of Things (IoT) devices that typically have limited memory and computing processor power as compared to other example playback devices because such IoT devices are generally not capable of performing the same types of sophisticated networking and audio playback operations performed by some example playback devices. To address the shortcoming of IoT devices in scenarios where it is desirable for such IoT devices to interoperate with example playback devices, application Ser. No. 17/508,028 describes scenarios where a playback device (e.g., configured as a group coordinator) performs certain functions relating to audio playback on behalf of an IoT device. However, application Ser. No. 17/508,028 does not describe playback devices configured to implement limited feature sets via implementing separate software applications corresponding to different playback roles in a manner consistent with example configurations disclosed herein. Further, application Ser. No. 17/508,028 also does not describe playback systems that include a centralized reference clock providing reference clock timing to audio sourcing devices and rendering playback devices, audio sourcing devices configured to distribute several streams of audio content and playback timing to playback devices based at least in part on the reference clock timing, and playback devices configured to locally mix and play the audio content from the several streams based at least in part on the reference clock timing consistent with example configurations disclosed herein. The entire contents of application Ser. No. 17/508,028 are incorporated herein by reference.

As yet another example, with respect to downloadable software applications, Sonos application Ser. No. 14/155,490 titled "Software Application and Zones" filed on Jan. 15, 2014, and issued as U.S. Pat. No. 9,300,647 on Mar. 29, 2016, describes add-on software applications that be installed in a playback device or group of playback devices, such as an add-on application for implementing equalizer pre-sets that adjusts frequency components of audio played by a playback device. Similarly, Sonos App. No. PCT/US2021/071598 titled "Concurrency rules for network microphone devices having multiple voice assistant services," filed on Sep. 25, 2021, and published as WO 2022/067345 on Mar. 31, 2022 describes scenarios where a playback device can download separate software applications corresponding to different voice assistance services. However, neither application Ser. No. 14/155,490 nor App. No. PCT/US2021/071598 describe playback devices configurable to download, install, and implement separate software applications depending on and/or according to the particular playback role of the playback device in a playback system. The entire contents of application Ser. No. 14/155,490 nor App. No. PCT/US2021/071598 are incorporated herein by reference.

Some example configurations disclosed herein include a playback device configured for operation in a playback system that includes a reference clock that is separate from the playback device. In some example configurations, the playback device is configured to, among other features, (i) receive reference clock timing information from the reference clock; (ii) receive two or more data streams, wherein each data stream comprises (a) audio content, and (b) playback timing information for the audio content; (iii) for each data stream of the two or more data streams, generate sample-rate adjusted audio content for the data stream by adjusting a sample rate of at least a portion of the audio content of the data stream to compensate for a difference between a rendering clock at the playback device and the received reference clock timing information; (iv) generate a mix of the sample-rate adjusted audio content of the two or more data streams at the playback device; and (v) play the mix of the sample-rate adjusted audio content of each data stream based on a clock time of the rendering clock at the playback device and the playback timing information for each data stream.

The above-described example configurations as well as additional and alternative example configurations are described in more detail herein. While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular example configurations of the disclosed technology. Accordingly, other example configurations can have other details, dimensions, angles and features without departing from the spirit or scope of the disclosure. In addition, those of ordinary skill in the art will appreciate that further example configurations of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some example configurations, a playback device includes one or more transducers or speakers powered by one or more amplifiers. In other example configurations, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some example configurations, an NMD is a stand-alone device configured primarily for audio detection. In other example configurations, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain example configurations, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some example configurations, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various example configurations of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain example configurations and examples are described below in the context of a home environment, the technologies described herein may be implemented in other types of environments. In some example configurations, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
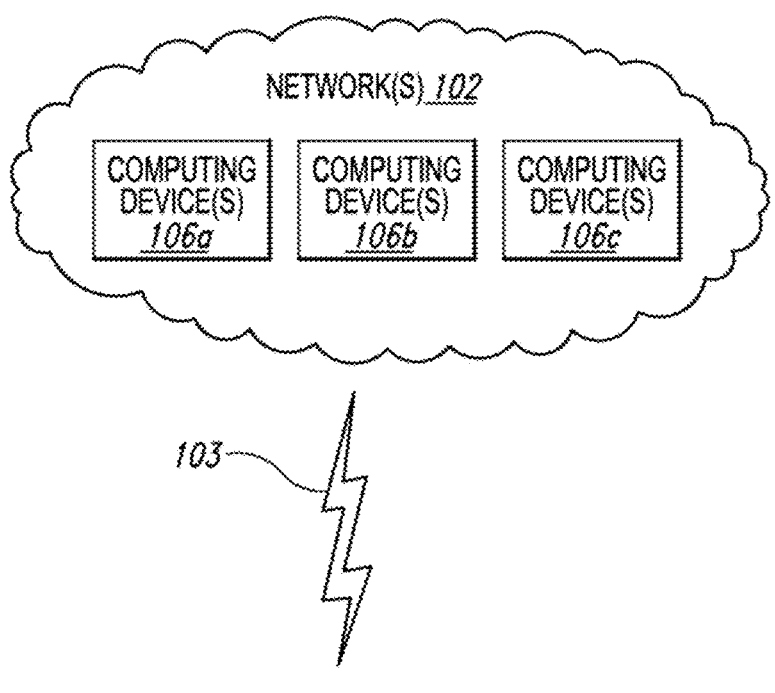
FIG. 1B shows a schematic diagram of the media playback system of FIG. 1A and one or more networks.
Figure 1B:
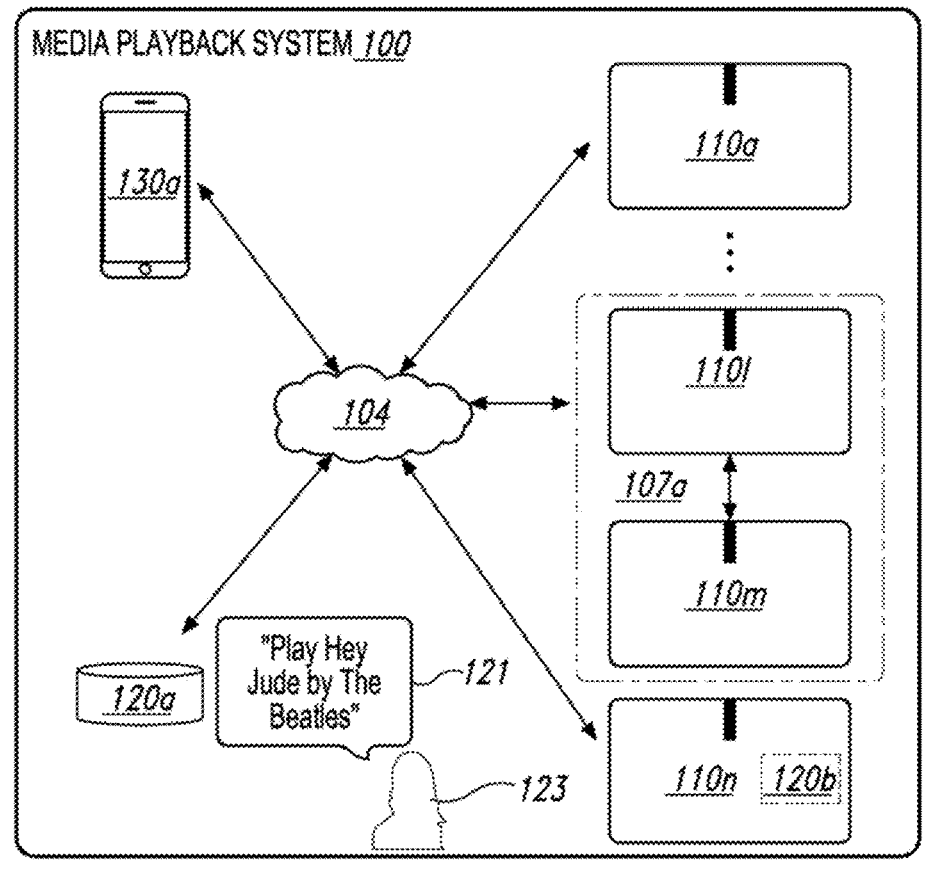

FIG. 1B is a schematic diagram of the media playback system 100 and a cloud network 102. For ease of illustration, certain devices of the media playback system 100 and the cloud network 102 are omitted from FIG. 1B. One or more communications links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/ or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some example configurations, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some example configurations, one or more of the computing devices 106 comprise modules of a single computer or server. In certain example configurations, one or more of the computing devices 106 comprise one or more modules, computers, and/or servers. Moreover, while the cloud network 102 is described above in the context of a single cloud network, in some example configurations the cloud network 102 comprises a plurality of cloud networks comprising communicatively coupled computing devices. Furthermore, while the cloud network 102 is shown in FIG. 1B as having three of the computing devices 106, in some example configurations, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some example configurations, the network 104 comprises a dedicated communication network that the media playback system 100 uses to transmit messages between individual devices and/or to transmit media content to and from media content sources (e.g., one or more of the computing devices 106). In certain example configurations, the network 104 is configured to be accessible only to devices in the media playback system 100, thereby reducing interference and competition with other household devices. In other example configurations, however, the network 104 comprises an existing household communication network (e.g., a household WiFi network). In some example configurations, the links 103 and the network 104 comprise one or more of the same networks. In some aspects, for example, the links 103 and the network 104 comprise a telecommunication network (e.g., an LTE network, a 5G network). Moreover, in some example configurations, the media playback system 100 is implemented without the network 104, and devices comprising the media playback system 100 can communicate with each other, for example, via one or more direct connections, PANs, telecommunication networks, and/or other suitable communications links.

In some example configurations, audio content sources may be regularly added or removed from the media playback system 100. In some example configurations, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some example configurations, for example, the media content database is stored on one or more of the playback devices 110, network microphone devices 120, and/or control devices 130.

In the illustrated embodiment of FIG. 1B, the playback devices **110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain example configurations, for example, the group 107*a* comprises a bonded zone in which the playback devices 110*l* and 110*m* comprise left audio and right audio channels, respectively, of multi-channel audio content, thereby producing or enhancing a stereo effect of the audio content. In some example configurations, the group 107*a* includes additional playback devices 110. In other example configurations, however, the media playback system 100 omits the group 107*a* and/or other grouped arrangements of the playback devices 110. Additional details regarding groups and other arrangements of playback devices are described in further detail below with respect to FIGS. 1-I** through IM.

The media playback system 100 includes the NMDs **120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some example configurations, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110**.

b. Suitable Playback Devices

FIG. 1C is a block diagram of the playback device **110*a* comprising an input/output 111. The input/output 111 can include an analog I/O 111*a* (e.g., one or more wires, cables, and/or other suitable communications links configured to carry analog signals) and/or a digital I/O 111*b* (e.g., one or more wires, cables, or other suitable communications links configured to carry digital signals). In some example configurations, the analog I/O 111*a* is an audio line-in input connection comprising, for example, an auto-detecting 3.5 mm audio line-in connection. In some example configurations, the digital I/O 111*b* comprises a Sony/Philips Digital Interface Format (S/PDIF) communication interface and/or cable and/or a Toshiba Link (TOSLINK) cable. In some example configurations, the digital I/O 111*b* comprises an High-Definition Multimedia Interface (HDMI) interface and/or cable. In some example configurations, the digital I/O 111*b* includes one or more wireless communications links comprising, for example, a radio frequency (RF), infrared, WiFi, Bluetooth, or another suitable communication protocol. In certain example configurations, the analog I/O 111*a* and the digital I/O 111*b*** comprise interfaces (e.g., ports, plugs, jacks) configured to receive connectors of cables transmitting analog and digital signals, respectively, without necessarily including cables.

The playback device **110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communications link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain example configurations, one or more of the playback devices 110, NMDs 120, and/or control devices 130 comprise the local audio source 105. In other example configurations, however, the media playback system omits the local audio source 105 altogether. In some example configurations, the playback device 110*a* does not include an input/output 111 and receives all audio content via the network 104**.

The playback device **110*a* further comprises electronics 112, a user interface 113** (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some example configurations, the playback device 110a optionally includes one or more microphones 115 (e.g., a single microphone, a plurality of microphones, a microphone array) (hereinafter referred to as "the microphones 115"). In certain example configurations, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some example configurations, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some example configurations, the operations further include causing the playback device 110a to send audio information to another one of the playback devices 110a and/or another device (e.g., one of the NMDs 120). Certain example configurations include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some example configurations, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some example configurations, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain example configurations, the network interface 112d includes the wired interface 112f and excludes the wireless interface 112e. In some example configurations, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some example configurations, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain example configurations, one or more of the audio processing components 112g can comprise one or more subcomponents of the processors 112a. In some example configurations, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some example configurations, for example, the amplifiers 112h include one or more switching or class-D power amplifiers. In other example configurations, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain example configurations, the amplifiers 112h comprise a suitable combination of two or more of the foregoing types of power amplifiers. Moreover, in some example configurations, individual ones of the amplifiers 112h correspond to individual ones of the transducers 114. In other example configurations, however, the electronics 112 includes a single one of the amplifiers 112h configured to output amplified audio signals to a plurality of the transducers 114. In some other example configurations, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some example configurations, the transducers 114 can comprise a single transducer. In other example configurations, however, the transducers 114 comprise a plurality of audio transducers. In some example configurations, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain example configurations, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example configurations disclosed herein. Additionally, one of ordinary skilled in the art will appreciate that a playback device is not limited to the examples described herein or to SONOS product offerings. In some example configurations, for example, one or more playback devices 110 comprises wired or wireless headphones (e.g., over-the-ear headphones, on-ear headphones, in-ear earphones). In other example configurations, one or more of the playback devices 110 comprise a docking station and/or an interface configured to interact with a docking station for personal mobile media playback devices. In certain example configurations, a playback device may be integral to another device or component such as a television, a lighting fixture, or some other device for indoor or outdoor use. In some example configurations, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some example configurations, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some example configurations, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some example configurations, the bonded playback device 110q includes additional playback devices and/ or another bonded playback device. Additional playback device example configurations are described in further detail below with respect to FIGS. 2A-3D.

c. Suitable Network Microphone Devices (NMDs)

Figures 1F, 1G, 1H:
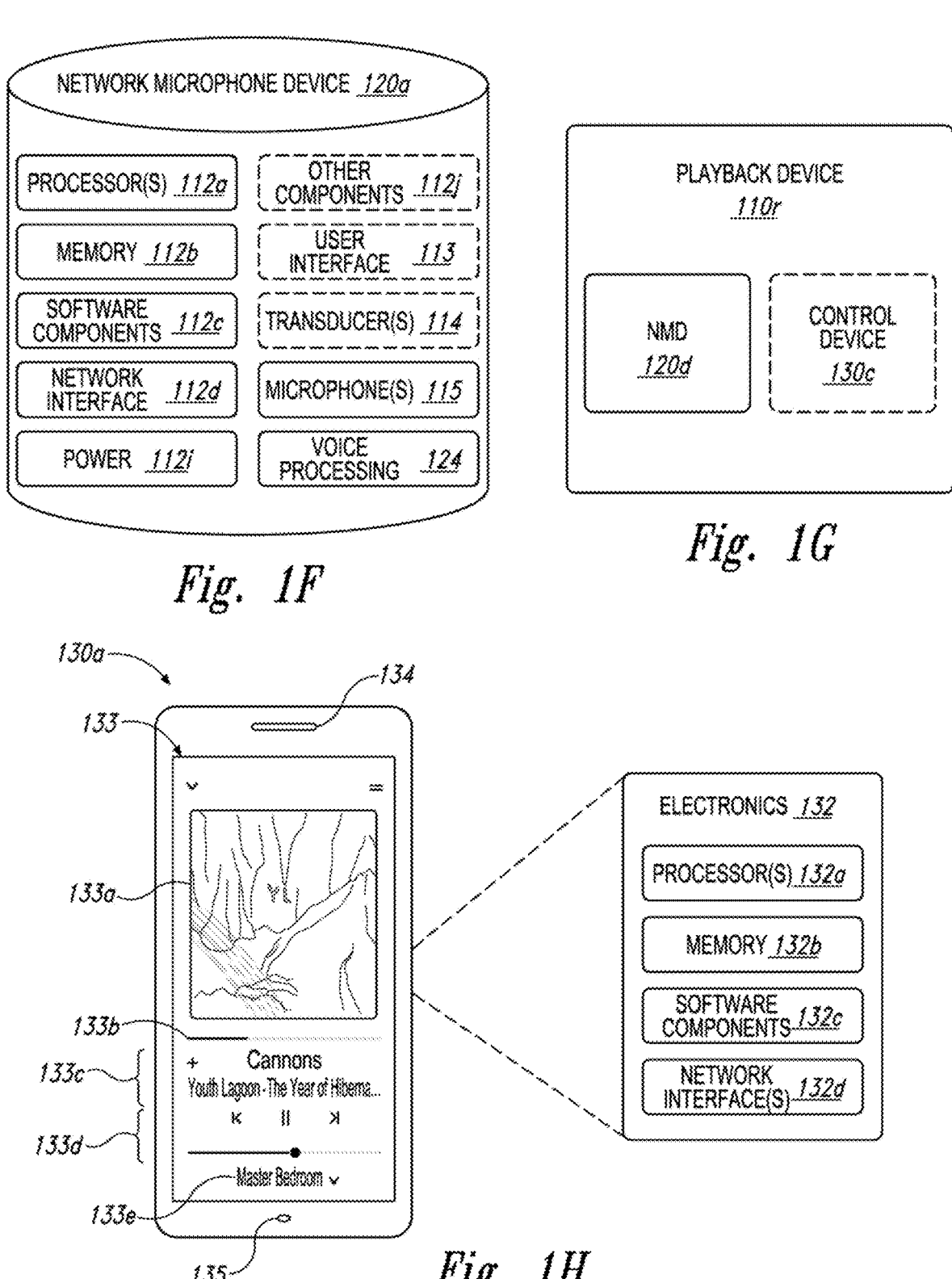
FIG. 1F shows a block diagram of a network microphone device.
FIG. 1G shows a block diagram of a playback device.
FIG. 1H shows a partially schematic diagram of a control device.

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some example configurations, the NMD 120a is configured as a media playback device (e.g., one or more of the playback devices 110), and further includes, for example, one or more of the audio processing components 112g (FIG. 1C), the transducers 114, and/or other playback device components. In certain example configurations, the NMD 120a comprises an Internet of Things (IoT) device such as, for example, a thermostat, alarm panel, fire and/or smoke detector, etc. In some example configurations, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some example configurations, the NMD 120a includes additional components (e.g., one or more sensors, cameras, thermometers, barometers, hygrometers).

In some example configurations, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other example configurations, however, the playback device 110r receives commands from another control device (e.g., the control device 130a of FIG. 1B). Additional NMD example configurations are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some example configurations, the control device 130a comprises, for example, a tablet (e.g., an iPad™), a computer (e.g., a laptop computer, a desktop computer), and/or another suitable device (e.g., a television, an automobile audio head unit, an IoT device). In certain example configurations, the control device 130a comprises a dedicated controller for the media playback system 100. In other example configurations, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some example configurations, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133$c$, a playback control region 133$d$, and a zone indicator 133$e$. The media content information region 133$c$ can include a display of relevant information (e.g., title, artist, album, genre, release year) about media content currently playing and/or media content in a queue or playlist. The playback control region 133$d$ can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133$d$ may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some example configurations, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130$a$. In some example configurations, the one or more speakers comprise individual transducers configured to correspondingly output low frequencies, mid-range frequencies, and/or high frequencies. In some aspects, for example, the control device 130$a$ is configured as a playback device (e.g., one of the playback devices 110). Similarly, in some example configurations the control device 130$a$ is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some example configurations, two or more of the microphones 135 are arranged to capture location information of an audio source (e.g., voice, audible sound) and/or configured to facilitate filtering of background noise. Moreover, in certain example configurations, the control device 130$a$ is configured to operate as playback device and an NMD. In other example configurations, however, the control device 130$a$ omits the one or more speakers 134 and/or the one or more microphones 135. For instance, the control device 130$a$ may comprise a device (e.g., a thermostat, an IoT device, a network device) comprising a portion of the electronics 132 and the user interface 133 (e.g., a touch screen) without any speakers or microphones. Additional control device example configurations are described in further detail below with respect to FIGS. 4A-4D and 5.

e. Suitable Playback Device Configurations

Figure 1M:
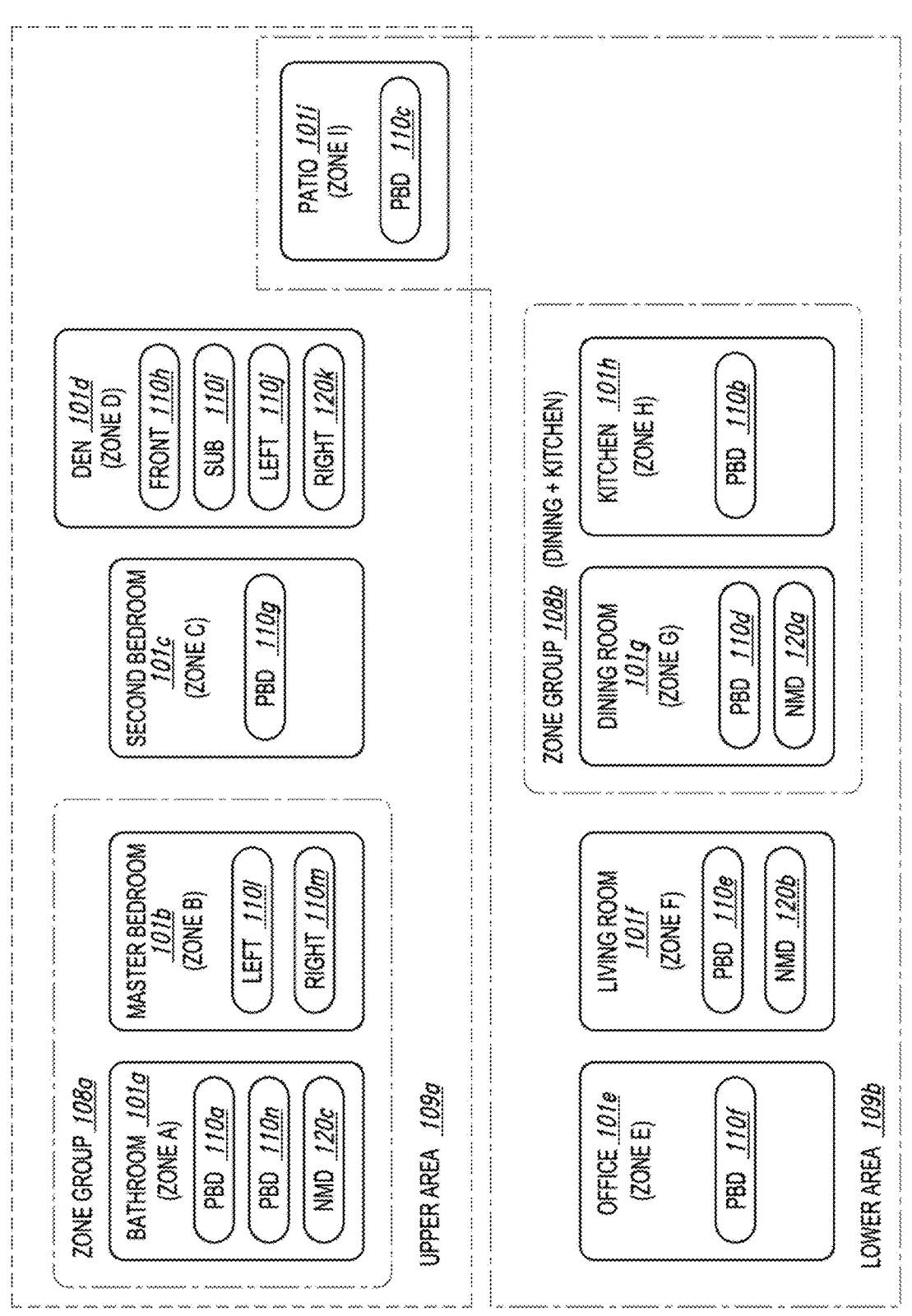
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110$g$ in the second bedroom 101$c$ (FIG. 1A) may belong to Zone C. In some implementations described below, multiple playback devices may be "bonded" to form a "bonded pair" which together form a single zone. For example, the playback device 110$l$ (e.g., a left playback device) can be bonded to the playback device 110$l$ (e.g., a left playback device) to form Zone A. Bonded playback devices may have different playback responsibilities (e.g., channel responsibilities). In another implementation described below, multiple playback devices may be merged to form a single zone. For example, the playback device 110$h$ (e.g., a front playback device) may be merged with the playback device 110$i$ (e.g., a subwoofer), and the playback devices 110$j$ and 110$k$ (e.g., left and right surround speakers, respectively) to form a single Zone D. In another example, the playback devices 110$g$ and 110$h$ can be merged to form a merged group or a zone group 108$b$. The merged playback devices 110$g$ and 110$h$ may not be specifically assigned different playback responsibilities. That is, the merged playback devices 110$h$ and 110$i$ may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110$l$ and 110$m$ may be bonded so as to produce or enhance a stereo effect of audio content. In this example, the playback device 110$l$ may be configured to play a left channel audio component, while the playback device 110$k$ may be configured to play a right channel audio component. In some implementations, such stereo bonding may be referred to as "pairing."

Additionally, bonded playback devices may have additional and/or different respective speaker drivers. As shown in FIG. 1J, the playback device 110$h$ named Front may be bonded with the playback device 110$i$ named SUB. The Front device 110$h$ can be configured to render a range of mid to high frequencies and the SUB device 110$i$ can be configured render low frequencies. When unbonded, however, the Front device 110$h$ can be configured render a full range of frequencies. As another example, FIG. 1K shows the Front and SUB devices 110$h$ and 110$i$ further bonded with Left and Right playback devices 110$j$ and 110$k$, respectively. In some implementations, the Right and Left devices 110$j$ and 102$k$ can be configured to form surround or "satellite" channels of a home theater system. The bonded playback devices 110$h$, 110$i$, 110$j$, and 110$k$ may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110$a$ and 110$n$ the master bathroom have the single UI entity of Zone A. In one embodiment, the playback devices 110$a$ and 110$n$ may each output the full range of audio content each respective playback devices 110$a$ and 110$n$ are capable of, in synchrony.

In some example configurations, an NMD is bonded or merged with another device so as to form a zone. For example, the NMD 120$b$ may be bonded with the playback device 110$e$, which together form Zone F, named Living Room. In other example configurations, a stand-alone network microphone device may be in a zone by itself. In other example configurations, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some example configurations, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some example configurations, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some example configurations, the media playback system 100 may not implement Areas, in which case the system may not store variables associated with Areas.

III. Example Systems and Devices

Figure 2A:
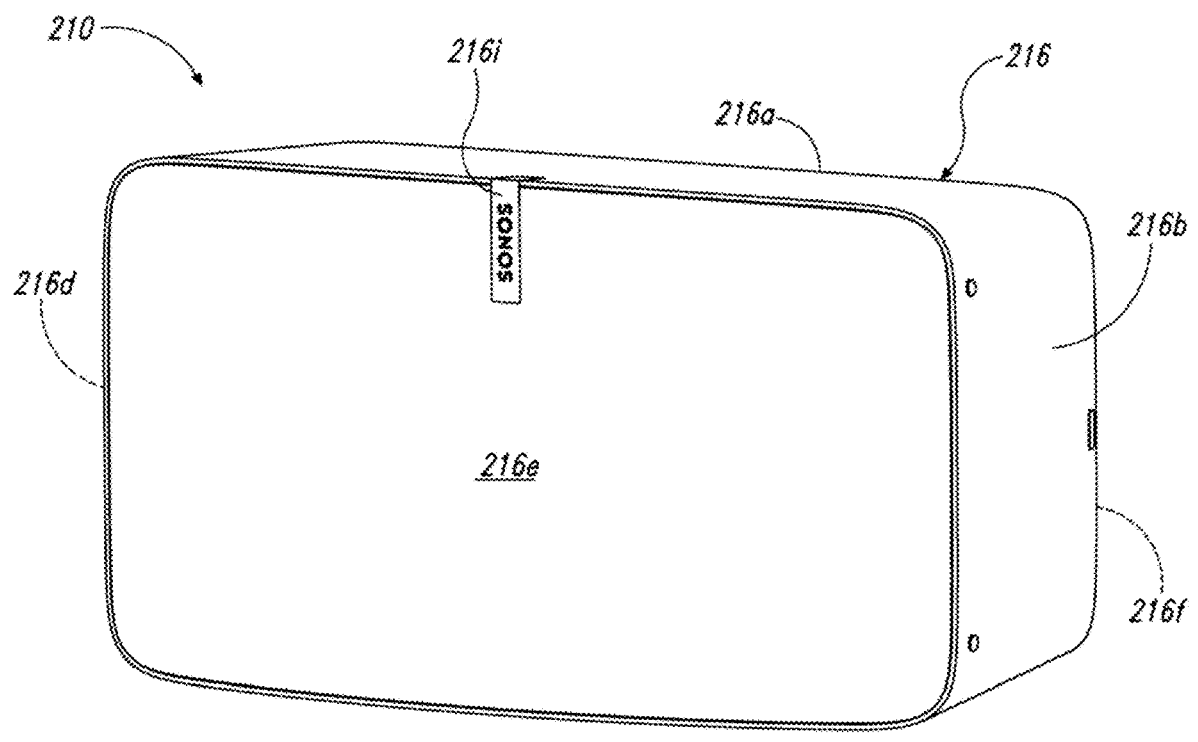
FIG. 2A shows a front isometric view of a playback device configured in accordance with aspects of the disclosed technology.
Figure 2B:
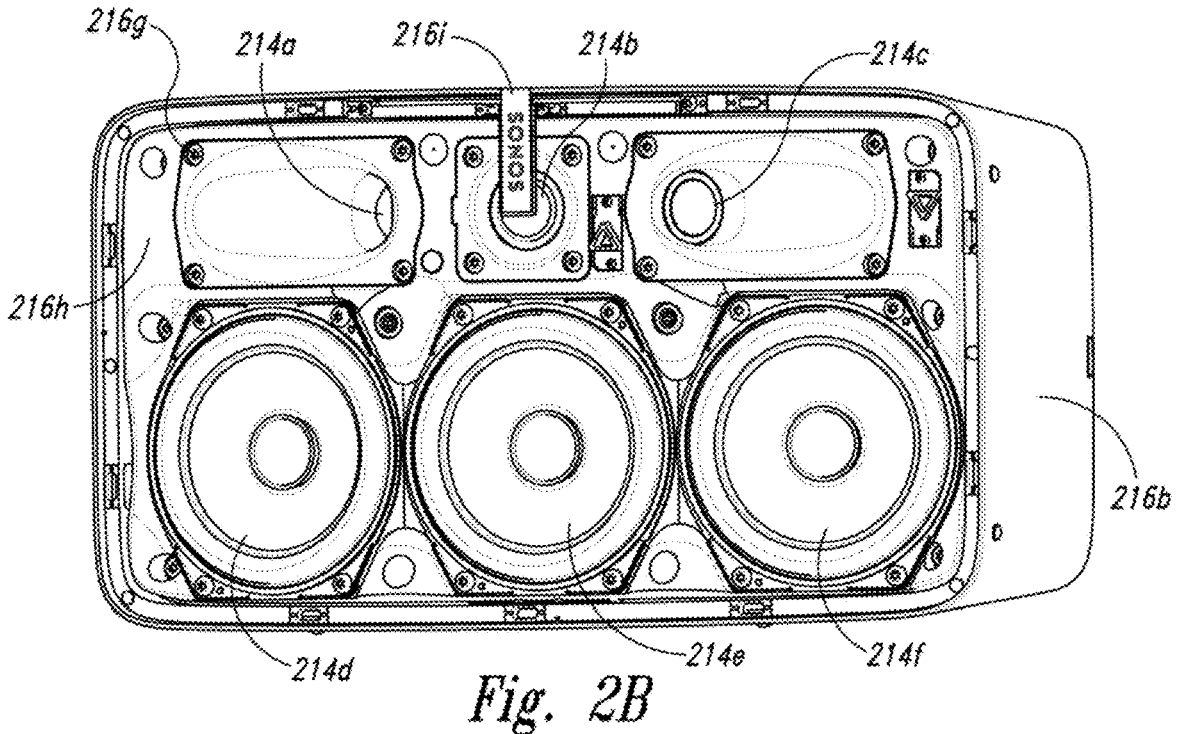
FIG. 2B shows a front isometric view of the playback device of FIG. 3A without a grille.
Figure 2C:
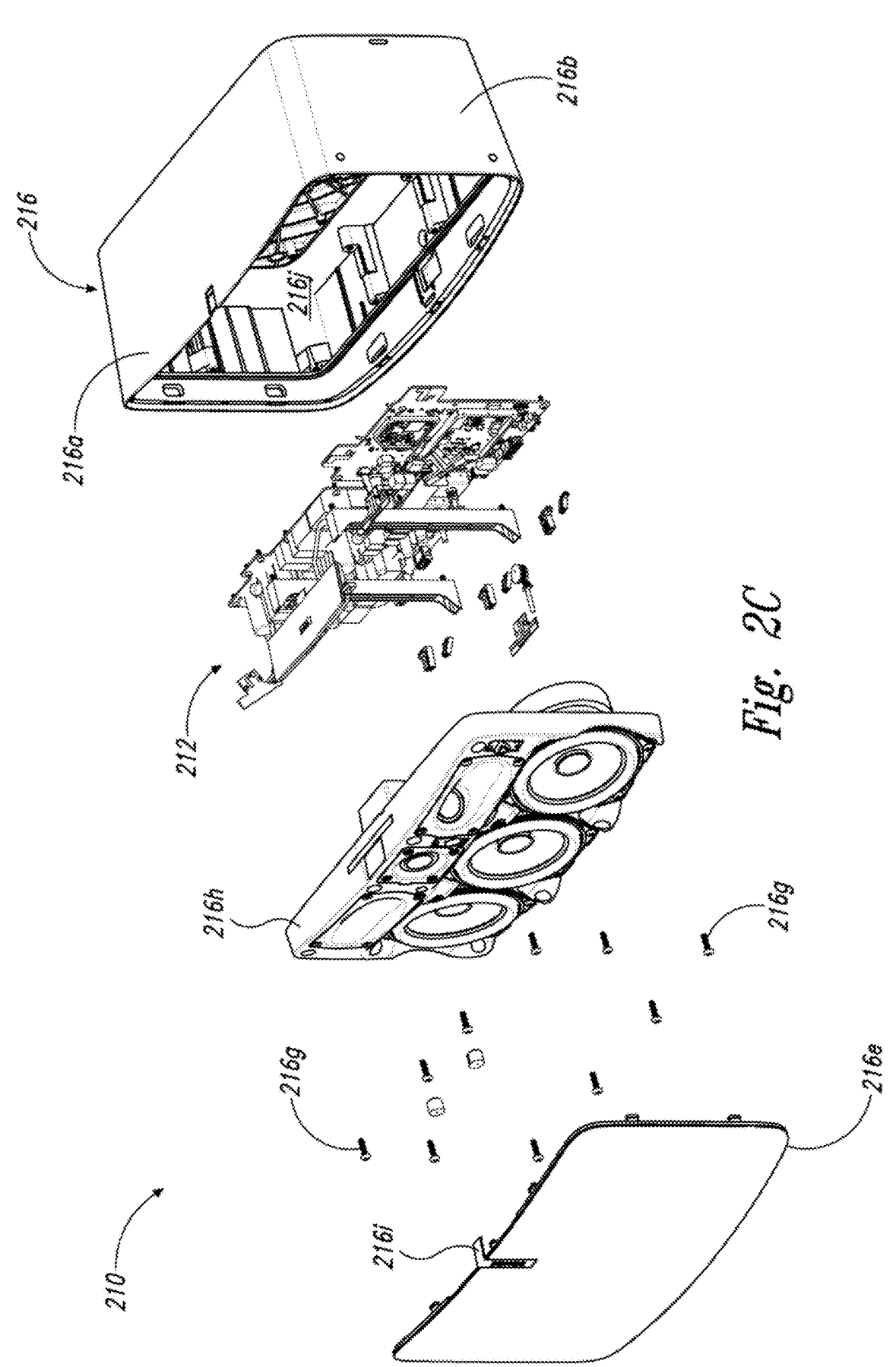
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some example configurations, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other example configurations, however, the playback device 210 includes more than six transducers (e.g., nine, ten). Moreover, in some example configurations, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some example configurations, however, the playback device 210 omits the filter 216i. In other example configurations, the playback device 210 includes one or more additional filters aligned with the transducers 214b and/or at least another of the transducers 214.

Figures 3A, 3B:
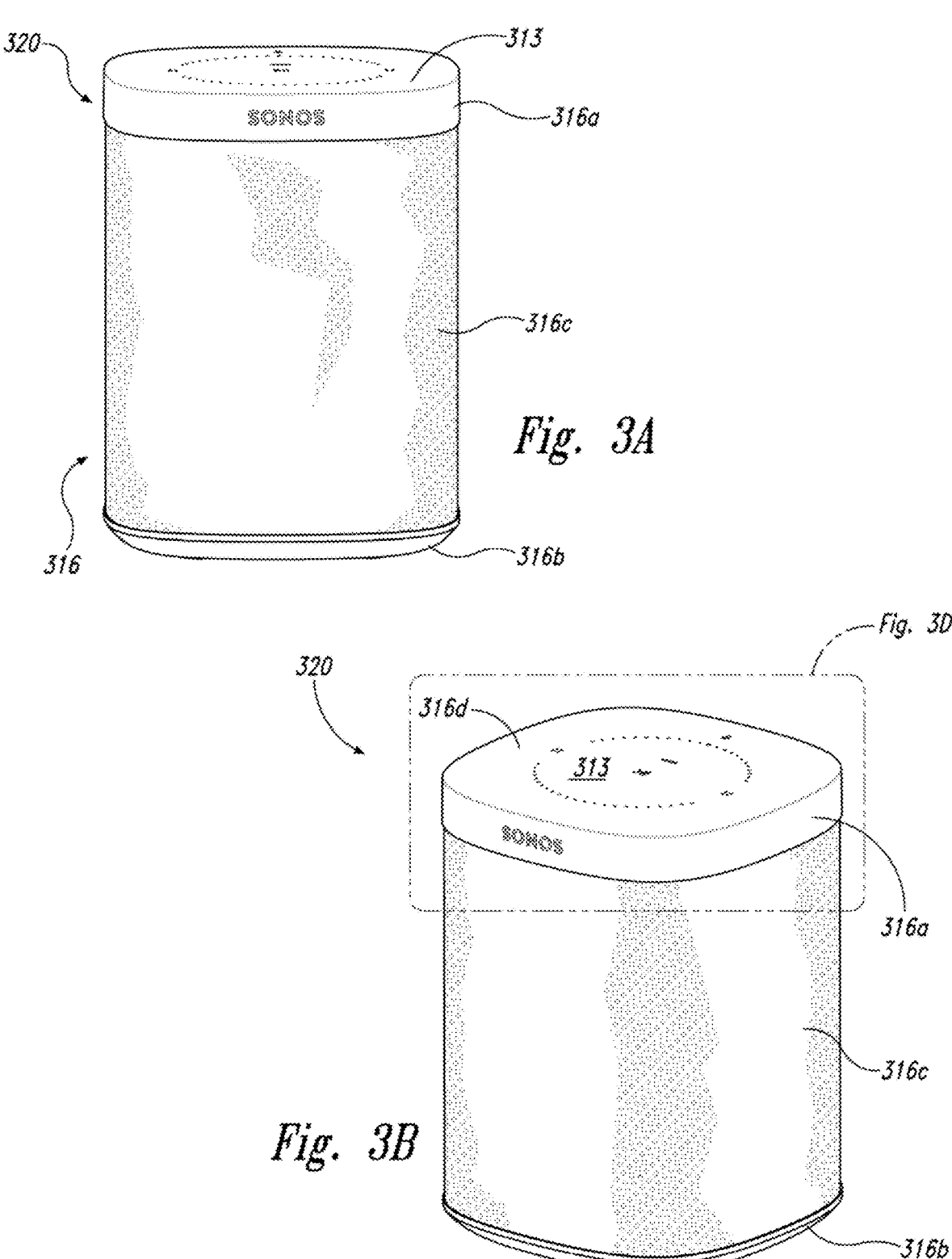
FIG. 3A shows a front view of a network microphone device configured in accordance with aspects of the disclosed technology.
FIG. 3B shows a side isometric view of the network microphone device of FIG. 3A.
Figure 3C:
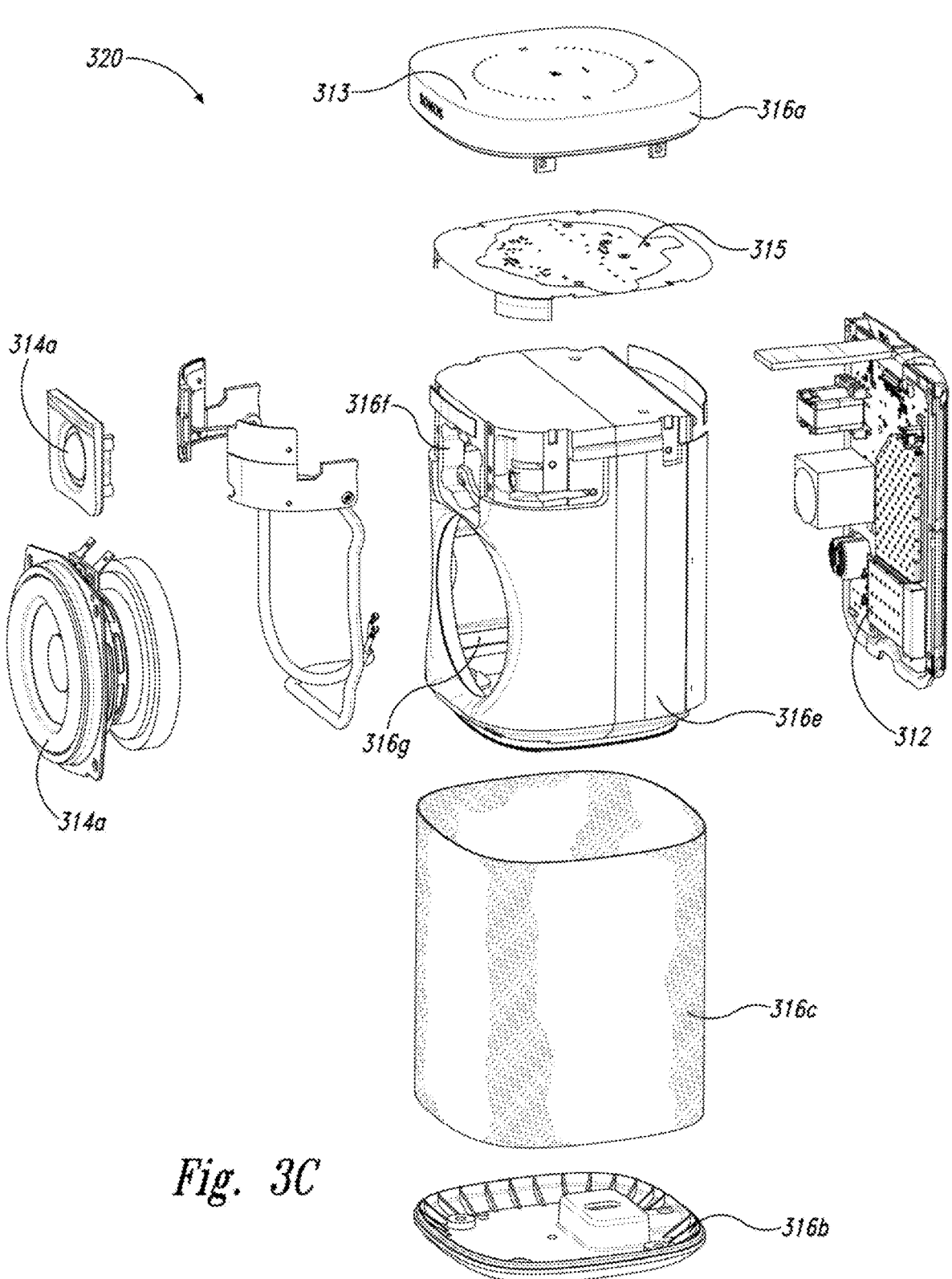
FIG. 3C shows an exploded view of the network microphone device of FIGS. 3A and 3B.
Figure 3D:
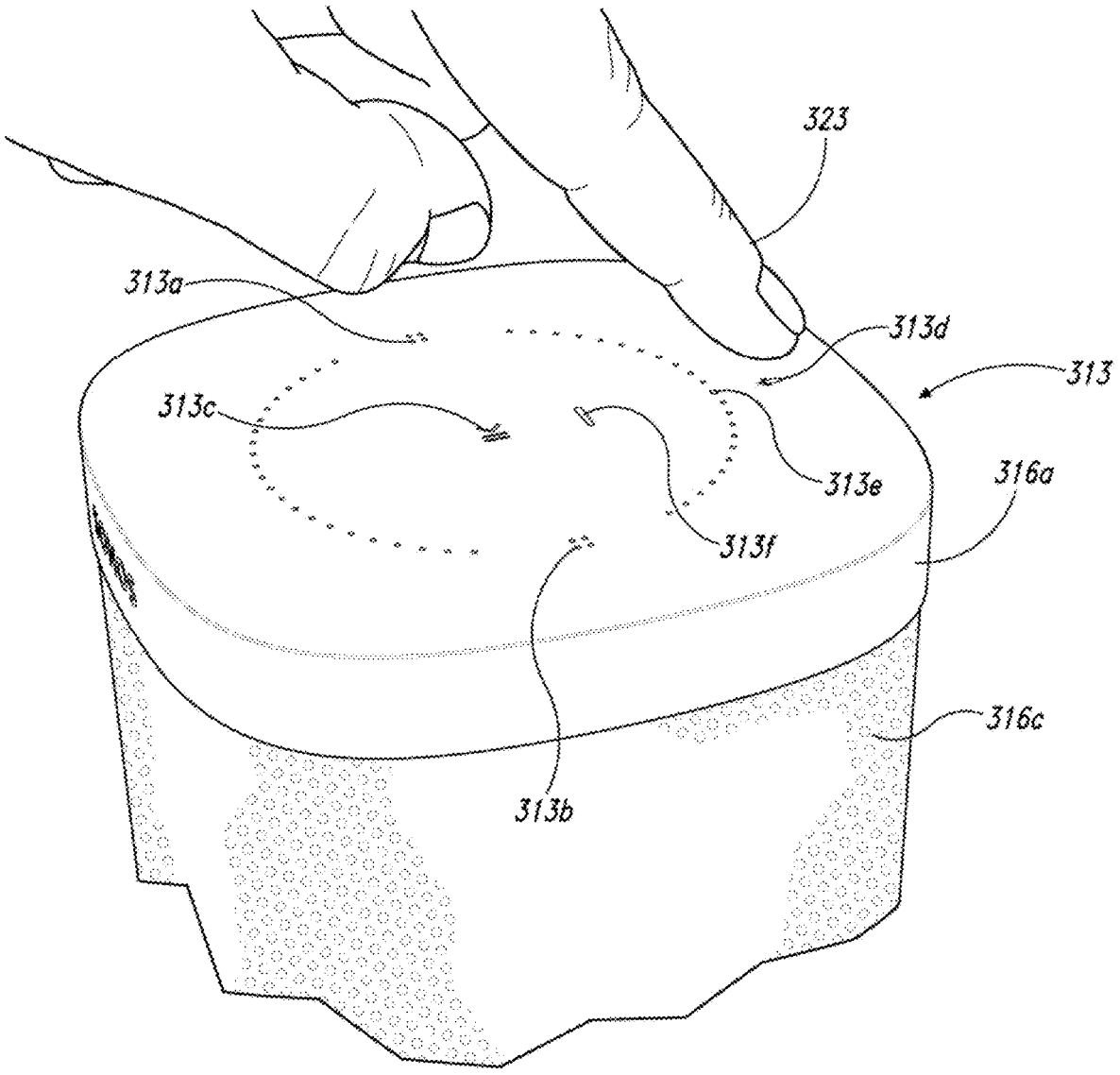
FIG. 3D shows an enlarged view of a portion of FIG. 3B.

FIGS. 3A and 3B are front and right isometric side views, respectively, of an NMD 320 configured in accordance with example configurations of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other example configurations, however, the NMD 320 includes a single transducer, or more than two (e.g., two, five, six) transducers. In certain example configurations, the NMD 320 omits the transducers 314*a* and 314*b* altogether.

Electronics 312 (FIG. 3C) includes components configured to drive the transducers 314*a* and 314*b*, and further configured to analyze audio information corresponding to the electrical signals produced by the one or more microphones 315. In some example configurations, for example, the electronics 312 comprises many or all of the components of the electronics 112 described above with respect to FIG. 1C. In certain example configurations, the electronics 312 includes components described above with respect to FIG. 1F such as, for example, the one or more processors 112*a*, the memory 112*b*, the software components 112*c*, the network interface 112*d*, etc. In some example configurations, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some example configurations, the user interface 313 includes additional or fewer control surfaces and illuminators. In one embodiment, for example, the user interface 313 includes the first indicator 313*e*, omitting the second indicator 313*f*. Moreover, in certain example configurations, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some example configurations, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain example configurations, however, the NMD 320 determines and/or performs one or more actions corresponding to the one or more voice commands without intervention or involvement of an external device, computer, or server.

Figures 3E, 3F:
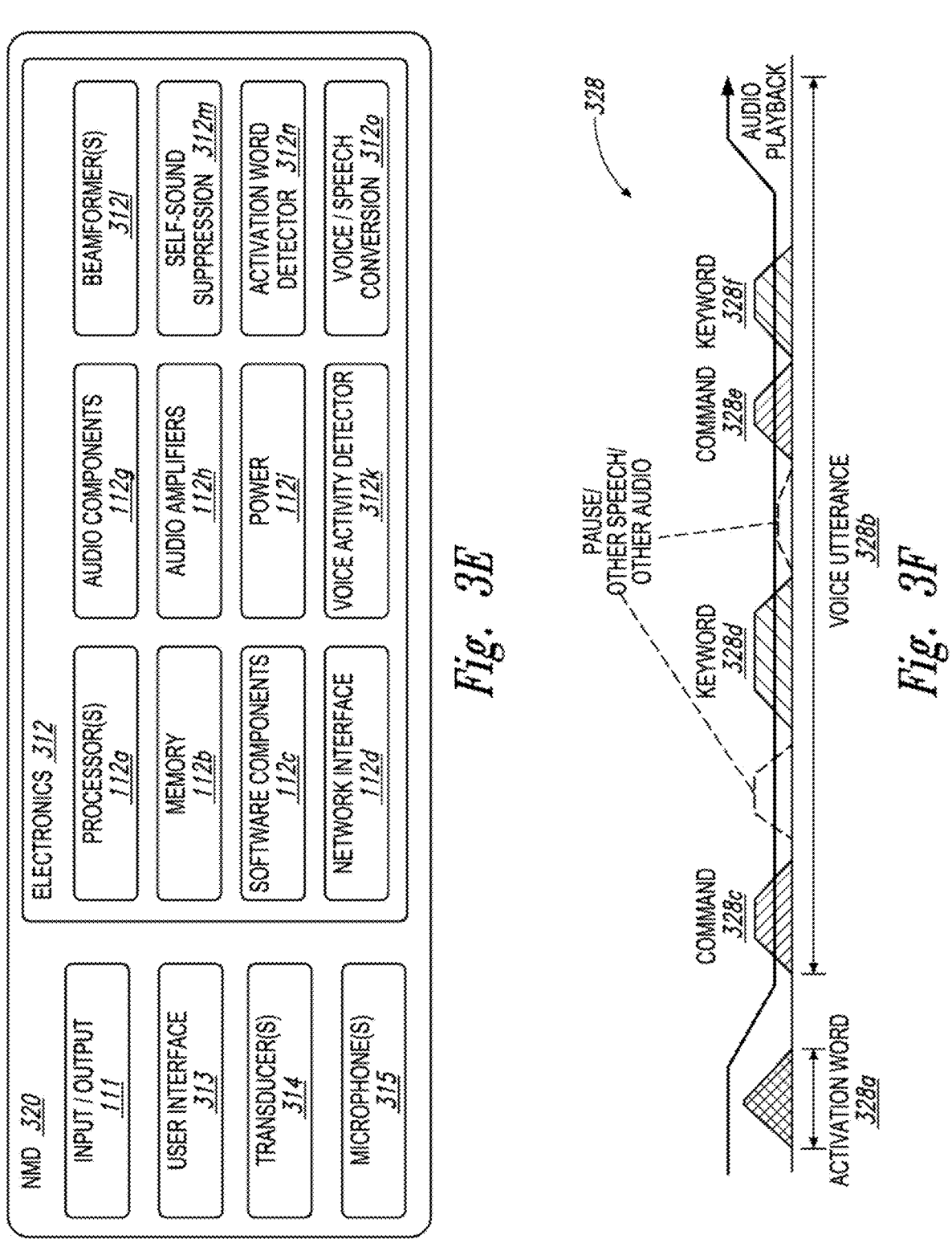
FIG. 3E shows a block diagram of the network microphone device of FIGS. 3A-3D
FIG. 3F shows a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some example configurations, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some example configurations, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some example configurations, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include a activation word portion 328*a* and a voice utterance portion 328*b*. In some example configurations, the activation word 557*a* can be a known activation word, such as "Alexa," which is associated with AMAZON's ALEXA®. In other example configurations, however, the voice input 328 may not include a activation word. In some example configurations, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some example configurations, the media playback system 100 is configured to temporarily reduce the volume of audio content that it is playing while detecting the activation word portion 557*a*. The media playback system

100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figures 4A, 4B, 4C, 4D:
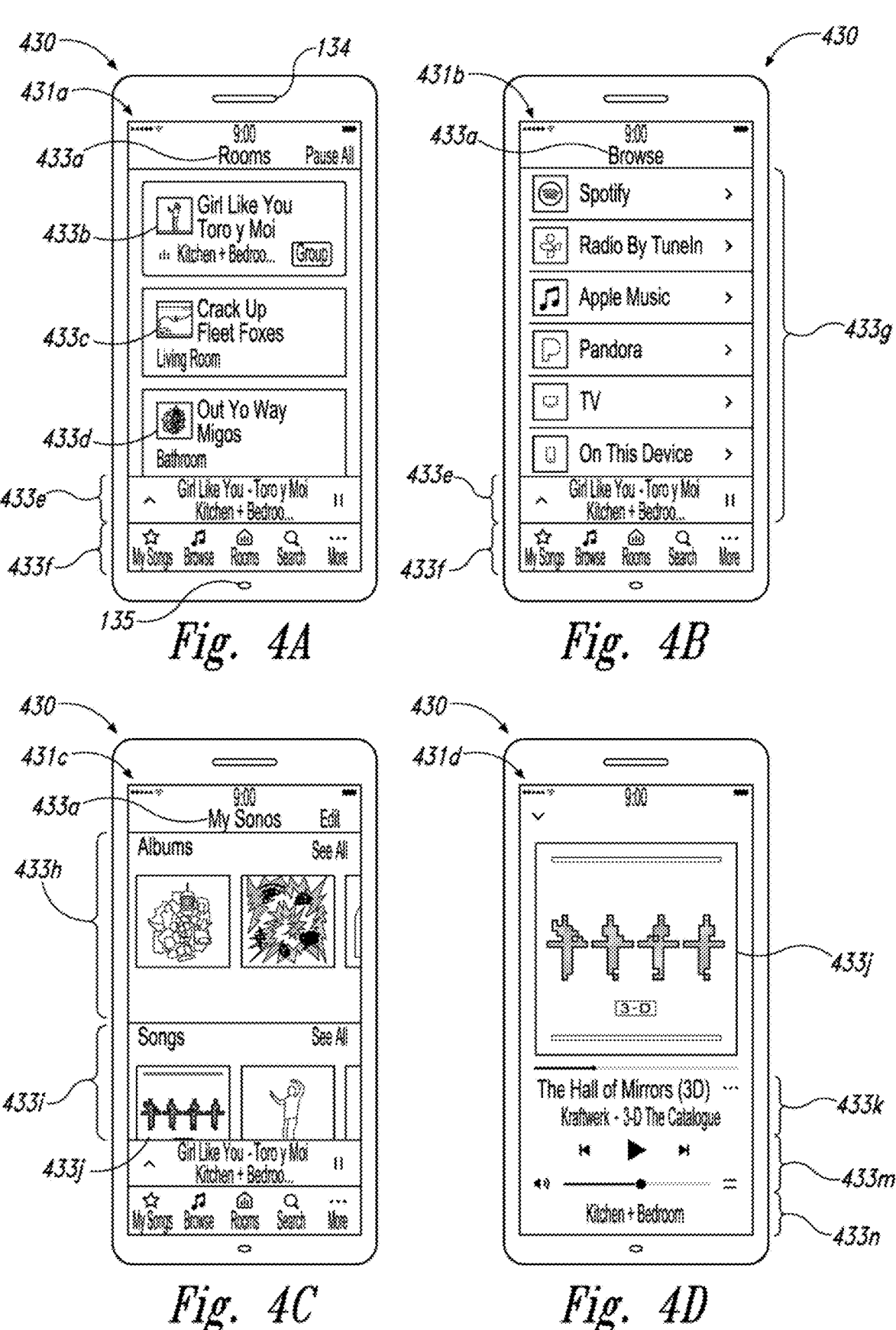
FIGS. 4A-4D show schematic diagrams of a control device in various stages of operation in accordance with aspects of the disclosed technology.

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
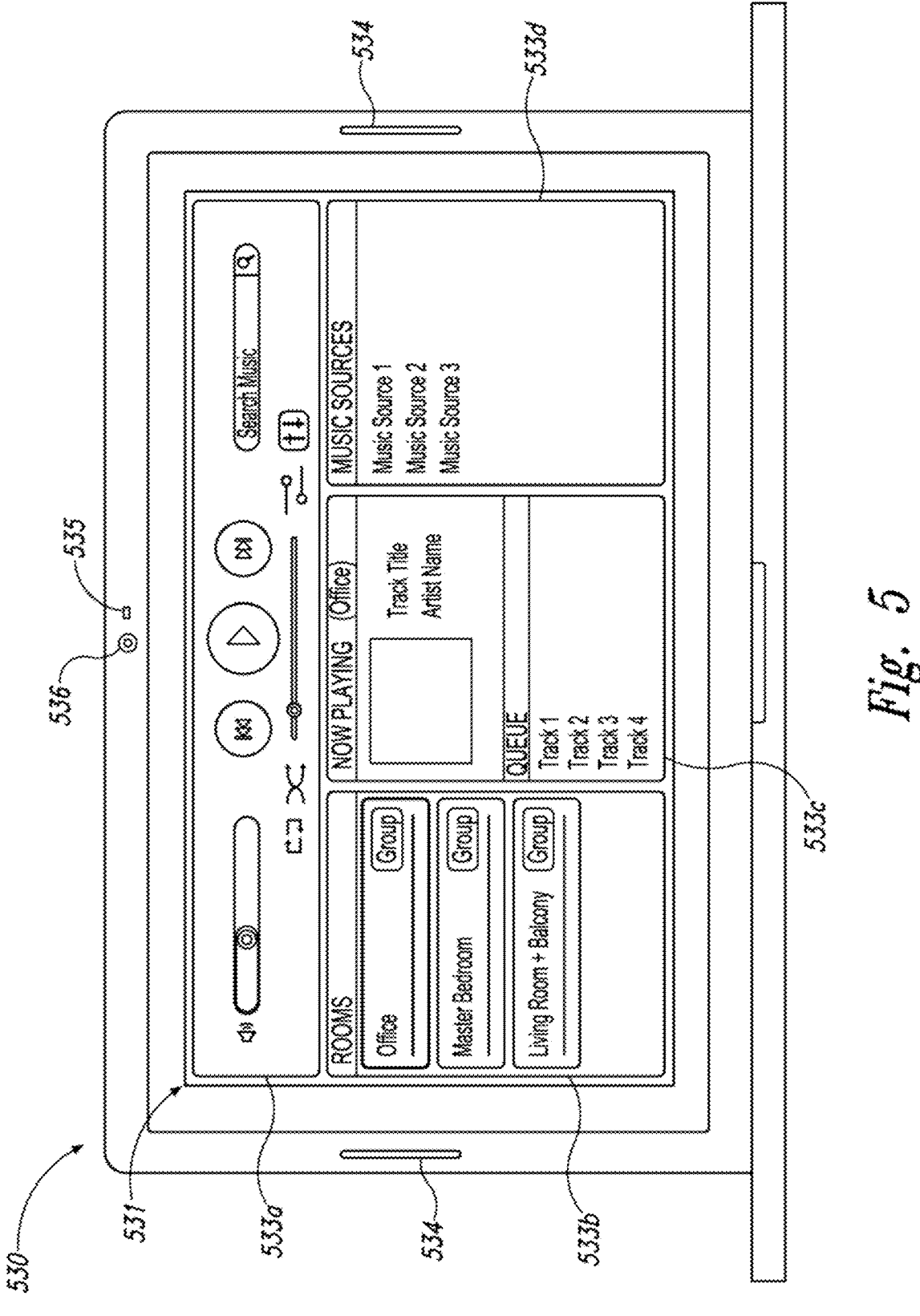
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, cross-fade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some example configurations, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some example configurations, the control device 530 includes other interactions and implementations for grouping and ungrouping zones via the user interface 531. In certain example configurations, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some example configurations, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some example configurations, for example, a playlist can be added to a playback queue, in which information corresponding to each audio item in the playlist may be added to the playback queue. In some example configurations, audio items in a playback queue may be saved as a playlist. In certain example configurations, a playback queue may be empty, or populated but "not in use" when the playback zone or zone group is playing continuously streaming audio content, such as Internet radio that may continue to play until otherwise stopped, rather than discrete audio items that have playback durations. In some example configurations, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
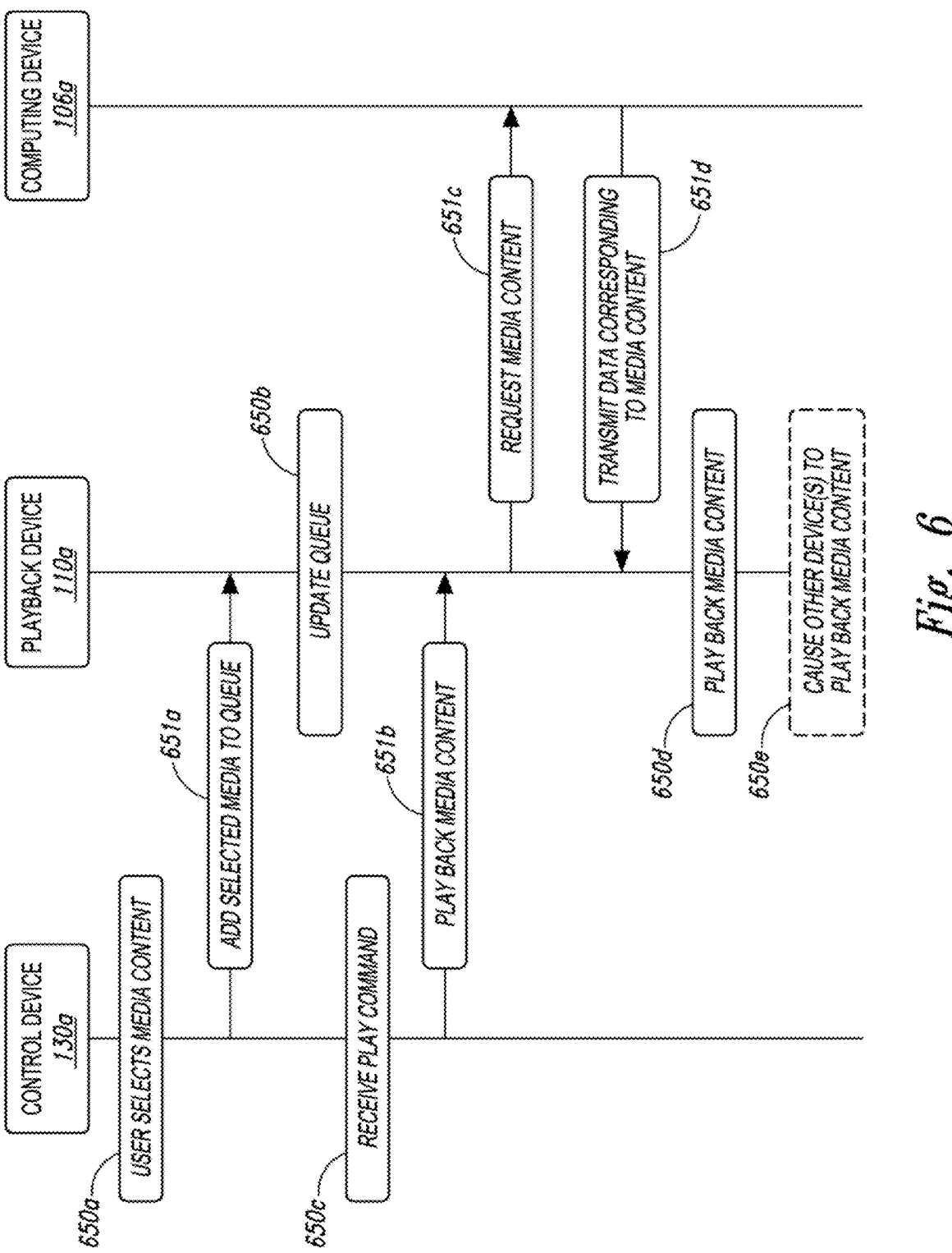
FIG. 6 shows a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the first computing device 106*a* requesting the selected media content. The first computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Configurations

Playback systems according to some example configurations disclosed herein include a reference clock, one or more audio sourcing devices, and one or more rendering playback devices configured to play audio. In some example configurations, the reference clock is configured to provide reference clock timing information to the one or more audio sourcing devices and the one or more rendering playback devices. In operation, individual audio sourcing devices use the reference clock timing information to generate playback timing for audio content, and individual rendering playback devices use the reference clock timing information to play audio based on the audio content and the playback timing received from an audio sourcing device. In some example configurations, individual playback devices mix audio from several data streams. In some such example configurations, individual playback devices mix audio from several data streams according to instructions from a system controller.

V. Technical Features

In some example configurations, at least some aspects of the technical solutions derive from the technical structure and organization of the audio content, the playback timing, and the reference clock timing information, including (i) how audio sourcing devices use the reference clock timing information to generate playback timing for audio content and (ii) how rendering playback devices use the reference clock timing to play audio based on audio content and playback timing received from audio sourcing devices.

Therefore, to aid in understanding certain aspects of the disclosed technical solutions, certain technical details of the audio content, playback timing, and reference clock timing information, as well as how audio sourcing devices use reference clock timing to generate playback timing and/or how rendering playback devices use playback timing and reference clock timing to play audio are described below. Except where noted, the technical details of the audio content, playback timing, and reference clock timing described herein are the same or substantially the same for all the examples shown and described with reference to FIGS. 7-9.

a. Audio Content

The audio content referred to herein may be any type of audio content now known or later developed. For example, in some example configurations, the audio content includes any one or more of: (i) streaming music or other audio obtained from a streaming media service, such as Spotify, Pandora, Sonos Radio, or other streaming media services; (ii) streaming music or other audio from a local music library, such as a music library stored on a laptop computer, desktop computer, smartphone, tablet, music server, or other computing device or system now known or later developed; (iii) audio content associated with video content, such as audio content associated with a television program or movie received from any of a streaming video service, or any other source of audio-visual media content now known or later developed; (iv) text-to-speech or other audible information from a voice assistant service (VAS), such as Amazon Alexa, Google Assistant, Sonos Voice Control, or other VAS services now known or later developed; (v) audio content from alarms and alerts, such as smoke alarms, fire alarms, doorbells, or other types of devices and/or systems configured to generate alarms and/or alerts now known or later developed; (vi) audio content that is generated and/or triggered to play from or based on an interaction with an Internet of Things (TOT) device, such as internet enabled home appliances, security systems, thermostats, door locks/door openers, lights, photo frames, sensors, and/or any other IOT device now known or later developed that is configured to generate audio and/or cause audio to be generated; (vi) audio from a home automation/control device (or home control application running on a computing device) such as an Amazon Echo/Echo Dot, Google Nest/Nest Mini, Control4 Neeo Remote, Crestron Smart Control, and/or any other home automation/control device or system, and/or (vii) audio content from a public address (PA) or paging system, telephone, video phone, video/teleconferencing system or other application configured to allow users to communicate with each other via audio and/or video.

In some example configurations, an audio sourcing device (which in some example configurations may be a group coordinator) obtains any of the aforementioned types of audio content from an audio source via an interface of the audio sourcing device, e.g., one of the audio sourcing device's network interfaces, a "line-in" analog interface, a digital audio interface, a "virtual line-in" interface (e.g., a software layer virtual abstraction that enables third party devices/IOT devices to connect wirelessly to the audio sourcing device to provide audio to the audio sourcing device for processing (and distribution, if applicable)), a network interface (e.g., a WiFi or Bluetooth interface) or any other interface suitable for receiving audio content in digital or analog format now known or later developed. In some example configurations, the audio sourcing device additionally or alternatively itself may generate the audio content. In some example configurations, the audio sourcing device obtains any of the aforementioned types of audio content via one or more of a Wireless Local Area Network (WLAN) interface or a Personal Area Network (PAN) link (e.g., a Bluetooth or other PAN link) from an audio source, e.g., an audio streaming service, another playback device, a smartphone, a tablet computer, a smartwatch, or other computing device now known or later developed that is suitable for providing audio content to the audio sourcing device.

An audio source is any system, device, or application that generates, provides, or otherwise makes available any of the aforementioned audio content to an audio sourcing device, including but not limited to a playback device, a smartphone, a tablet computer, a smartwatch, a network server, a content service provider, a home appliance, a security system, industrial equipment, tools, a home control/automation system, or other computing system or device now known or later developed that is suitable for providing audio content to an audio sourcing device.

An audio sourcing device is any network device that receives or otherwise obtains audio content from an audio source for processing and distribution (as described herein) to one or more rendering playback devices (i.e., a playback group) in a playback system. Examples of a playback group include a synchrony group, a paired configuration, a stereo pair configuration, a home theater group, or any other grouping of two or more playback devices configured to play audio content together in a groupwise manner. As mentioned above, in some example configurations, the audio sourcing device may itself generate audio content in some scenarios, and in such scenarios, the audio source and the audio sourcing device may be the same device and/or application.

In some example configurations, the audio sourcing device may be a playback device configured to function as a group coordinator for a playback group. In some example configurations, a group coordinator is a playback device configured to perform all the functions of an audio sourcing device was well as performing other management and control functions for a playback group, including but not necessarily limited to adding and/or removing playback devices from the playback group, processing commands for the playback group (e.g., volume up, volume down, play, pause, stop, etc.), and other playback group control and management functions. In some example configurations, a group coordinator additionally plays audio content in a groupwise manner with the one or more rendering playback devices (e.g., group members) in the playback group and/or playback system. In some example configurations, the audio sourcing device may be a device different than a playback device. For example, in some configurations where the audio sourcing device and the audio source are the same, the audio sourcing device may be any of the types of audio sources described above.

In some example configurations, the audio sourcing device transmits the processed audio content to all the rendering playback devices configured to play audio based on the audio content. In some example configurations, the audio sourcing device transmits the processed audio content to all rendering playback devices in a playback system (either via an individual unicast transmission, a multicast transmission, or a broadcast transmission), even rendering playback devices that may not be configured to play audio based on that audio content. In some example configurations, the audio sourcing device transmits particular audio content to a particular multicast network address, and each rendering playback device configured to play audio based on that particular audio content receives that particular audio content via that particular multicast address. In operation, receiving audio content via a particular multicast address in some example configurations requires a rendering playback device to join or subscribe to a multicast group corresponding to that particular multicast address.

In some example configurations, the audio sourcing device receives audio content from an audio source in digital form, e.g., via an incoming stream of packets or frames. In some example configurations, individual packets or frames in the incoming stream have a sequence number or other identifier that specifies an ordering of the packets within the incoming stream. In operation, the audio sourcing device uses the sequence number or other identifier to detect missing packets or frames and/or to reassemble the packets or frames of the incoming stream in the correct order before performing further processing. In some example configurations, the sequence number or other identifier that specifies the ordering of the packets or frames is or at least comprises a timestamp indicating a time when the packet or frame was created. The packet/frame creation time is sometimes used as a sequence number based on an assumption that packets/ frames are created in the order in which they should be subsequently played out.

For example, in some example configurations, individual packets from an audio source may include both a timestamp and a sequence number. The timestamp is typically used to place the incoming packets of audio content in the correct order, and the sequence number is typically used to detect packet losses (i.e., missing packets). In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets can have the same timestamp.

In some example configurations, the audio sourcing device does not change the sequence number or identifier of a received packet during processing. In some example configurations, the audio sourcing device reorders at least a first set of packets in a first incoming packet stream received from an audio source (an inbound stream) based on each packet's sequence identifier, extracts audio content from the received packets, reassembles a bitstream of audio content from the received packets, and then repacketizes the reassembled bitstream into a second set of packets (an outbound stream), where packets in the second set of packets have sequence numbers and/or timestamps that differ from the sequence numbers and/or timestamps of the packets in the first set of packets (or first stream). The audio content in this outbound stream is sometimes referred to herein as processed audio content.

In some example configurations, individual packets in the second stream (i.e., the outbound stream) are a different length (i.e., shorter or longer) than individual packets in the first stream (i.e., the inbound stream). In some example configurations, reassembling a bitstream from the incoming packet stream and then subsequently repacketizing the reassembled bitstream into a different set of packets facilitates uniform processing and/or transmission of the processed audio content by the audio sourcing device and uniform processing by the rendering playback devices that receive the processed audio content from the audio sourcing device.

However, for some delay-sensitive audio content, reassembly and repacketization may be undesirable, and therefore, in some example configurations, the audio sourcing device may not perform reassembly and repacketization for some (or all) audio content that it receives before distributing the audio content to rendering playback devices. In such embodiments, the audio sourcing device distributes the delay-sensitive audio content to rendering devices with the same packetization as it was received by the audio sourcing device, with either (i) playback timing appended to the packets of audio content as overhead or (ii) playback timing provided separately from the packets of audio content and associated with the audio content (e.g., by providing time-stamping data in the playback timing information that enables a rendering device to match up received playback timing with corresponding packets of audio content).

b. Playback Timing

As mentioned above, one of the functions performed by an audio sourcing device is to generate playback timing for audio content. In an example operation, individual rendering playback devices use the playback timing generated by the audio sourcing device to play audio based on the audio content received from the audio sourcing device.

In some example configurations, the audio sourcing device transmits playback timing separately from the processed audio content. In some example configurations, the audio sourcing device transmits the playback timing to all the rendering playback devices in a playback group by transmitting the playback timing to a multicast network address for the playback group, and all the rendering playback devices in the playback group receive the playback timing via the playback group's multicast address. In some example configurations, the audio sourcing device transmits the playback timing to each rendering playback device by transmitting the playback timing to each rendering playback device's unicast network address.

In some example configurations, the audio sourcing device generates playback timing for individual frames (or packets) of processed audio content. As mentioned earlier, in some example configurations, the processed audio content is packaged in a series of frames (or packets) where individual frames (or packets) comprise a portion of the audio content. In some example configurations, the playback timing for the audio content includes a playback time for each frame (or packet) of audio content. In some example configurations, the playback timing for an individual frame (or packet) is included within the frame (or packet), e.g., in the header of the frame (or packet), in an extended header of the frame (or packet), and/or in the payload portion of the frame (or packet).

In some example configurations, the playback time for an individual frame (or packet) is identified within a timestamp or other indication. In such example configurations, the timestamp (or other indication) represents a time to play the one or more portions of audio content within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated.

In operation, a rendering playback device or any other playback device tasked with playing particular audio content will play the portion(s) of the particular audio content within an individual frame (or packet) at the playback time specified by the playback timing for that individual frame (or packet), as adjusted to accommodate for differences between the reference clock timing and a clock at the playback device (e.g., a rendering clock at a rendering playback device).

c. Reference Clock Timing Information

The audio sourcing devices disclosed and described herein use reference clock timing information to generate playback timing for audio content. And rendering playback devices use reference clock timing information to play audio based on audio content and playback timing received from audio sourcing devices (e.g., group coordinators and/or other network devices configured to source audio content for playback systems).

In some example configurations, an audio sourcing device uses reference clock timing from a reference clock (e.g., a device clock, a digital-to-audio converter clock, a playback time reference clock, or any other clock) to generate playback timing for audio content that the audio sourcing device receives or otherwise obtains from an audio source. The reference clock can be a "local" clock at the audio sourcing device or a "remote" clock at a separate network device, e.g., a dedicated playback system clock, another playback device, a computing device, or another network device configured to provide clock timing for use by (i) an audio sourcing device to generate playback timing and/or (ii) a rendering playback device to play audio based on the playback timing associated with the audio content. In some example scenarios, the playback system is configured to obtain clock timing from a "remote" clock at a network device via a Wide Area Network (WAN).

In some example configurations, each rendering playback device in a synchrony group and/or other playback group or playback system tasked with playing particular audio content in a groupwise manner use the same reference clock timing information from the same reference clock to play back that particular audio content in synchrony with all the other rendering playback devices in the playback group and/or other playback system. In some example configurations, rendering playback devices use the same reference clock timing to play audio content that the audio sourcing device used to generate the playback timing for the audio content.

In some example configurations, the device that generates the reference clock timing also transmits the reference clock timing to (i) all the audio sourcing devices that need to use the reference clock timing for generating playback timing and (ii) all the rendering playback devices that need to use the reference clock timing for playing back audio. In some example configurations, the device that generates the reference clock timing transmits the reference clock timing to a multicast network address, and (i) audio sourcing devices configured to generate playback timing receive the reference clock timing via that multicast address and (ii) rendering playback devices configured to use the reference clock timing to play audio also receive the reference clock timing via that multicast address. In some example configurations, the device that generates the reference clock timing alternatively transmits the reference clock timing to each unicast network address of each other device that uses the reference clock timing, i.e., each audio sourcing device and each rendering playback device.

In some example configurations, an individual rendering playback device configured to play audio content determines one or more of (i) a difference between the reference clock time and a clock time of a rendering clock at the rendering playback device (and/or vice versa), (ii) a difference between the clock rate of the reference clock and the clock rate of the rendering clock at the rendering playback device (and/or vice versa), and (iii) whether and the extent to which the clock rate of the reference clock has drifted relative to the clock rate of the rendering clock at the rendering playback device (and/or vice versa). In some example configurations, each rendering playback device uses its own determined difference between the clock times, clock rates, and/or clock drift to (i) adjust received playback timing to account for the timing difference(s) and/or (ii) adjust a sample rate of the audio content to be played in connection with synchronous playback of the audio.

For example, instead of (or perhaps in combination with) adjusting playback timing described below, some example configurations alternatively (or additionally) include each rendering playback device using the determined difference(s) between the reference clock timing and the rendering clock timing to facilitate one or both of (i) dropping one or more samples of audio content, e.g., not playing the dropped samples, thus effectively skipping those samples, and/or (ii) adding one or more samples of audio content, e.g., injecting small periods of silence (typically less than 15-20 milliseconds) during playback. By adjusting the sample rate of the audio content to be played based on differences in clock times, clock rates, and/or clock drift between the reference clock and the rendering clock, the rendering playback device can in some instances facilitate the synchronous playback process by helping to account for the differences in the clock times, clock rates, and/or clock drift instead of (or in addition to) the timing offsets and timing advances described further herein in connection with playing audio based on the generated playback timing.

d. Generating Playback Timing

In some example configurations, for an individual stream of audio content, the audio sourcing device: (i) generates playback timing for the audio content based on clock timing from a reference clock (which may be either a local clock at the audio sourcing device or a clock at another network device separate from the audio sourcing device, e.g., a dedicated reference clock for a playback system), and (ii) transmits the generated playback timing to all the playback devices configured to play the audio content, e.g., all the rendering playback devices configured to play that individual stream of audio content. In some example configurations, when generating playback timing for an individual frame (or packet) of audio content, the audio sourcing device adds a "timing advance" to the current clock time of the reference clock that the audio sourcing device is using for generating the playback timing.

In some example configurations, the "timing advance" is based on an amount of time that is greater than or equal to the sum of (i) the network transit time required for frames and/or packets comprising audio content transmitted from the audio sourcing device (e.g., a group coordinator or other sourcing device) to arrive at the rendering playback device(s) and (ii) the amount of time required for all the rendering playback devices (e.g., group members or other rendering playback devices) to process received frames/ packets from the audio sourcing device for playback.

In some example configurations, the audio sourcing device individually or in combination with one or more other networked computing devices determines a timing advance by sending one or more test packets to each rendering playback device, and then receiving test response packets back from each rendering playback device. In some example configurations, the audio sourcing device and the rendering playback device negotiate (or otherwise individually or in combination determine) a timing advance via multiple test and response messages. In some example configurations with more than two rendering playback devices, the audio sourcing device determines a timing advance by exchanging test and response messages with all of the rendering playback devices in the playback group, and then setting a timing advance that is sufficient for the rendering playback device having the longest total of network transmit time and packet processing time.

In some example configurations, the timing advance is less than about 50 milliseconds. In some example configurations, the timing advance is less than about 20-30 milliseconds. And in still further example configurations, the timing advance is less than about 10 milliseconds. In some example configurations, the timing advance remains constant after being determined, or at least constant for the duration of a playback session or perhaps constant during playback of an individual item of audio content (e.g., an individual track, an individual audio message, or similar item of content). In other example configurations, the audio sourcing device can change the timing advance in response to a request from a rendering playback device indicating that a greater timing advance is required (e.g., because the rendering playback device is not receiving packets in sufficient time to play the audio according to the playback timing) or a shorter timing advance would be sufficient (e.g., because the rendering playback device is buffering more packets comprising portions of audio content than necessary to provide consistent, reliable playback).

As described in more detail below, all the rendering playback devices in a playback system configured to play the audio content in synchrony will use the playback timing and the reference clock timing to play the audio content in a groupwise manner (e.g., in synchrony with each other).

e. Generating Playback Timing with Clock Timing from a Remote Clock

In some example configurations, the audio sourcing device individually or in combination with one or more other networked computing devices, may generate playback timing for audio content based on reference clock timing information from a "remote" clock at another network device, e.g., another playback device, another computing device (e.g., a reference clock for the playback system, a smartphone, tablet computer, smartwatch, or other computing device configurable to provide reference clock timing sufficient for use by the audio sourcing device to generate playback timing). For example, in some example configurations, a system reference clock may be configured to generate and provide reference clock timing to several audio sourcing devices within a playback system. It can be more involved for an audio sourcing device to generate playback timing based on reference clock timing information from a remote reference clock (i.e., at another network device) than it is for the sourcing audio device to generate playback timing based on reference clock timing from a local reference clock at the audio sourcing device.

In some example configurations where the audio sourcing device generates playback timing for audio content based on reference clock timing from a separate reference clock, the playback timing that the audio sourcing device generates for an individual frame (or packet) is based on (i) a "timing offset" between (a) a local clock at the audio sourcing device that the audio sourcing device uses for generating the playback timing and (b) the reference clock timing from the remote reference clock, and (ii) a "timing advance" based on an amount of time that is greater than or equal to the sum of (a) the network transit time required (or at least desired) for packets transmitted from the audio sourcing device to arrive at the rendering playback device(s) and (b) the amount of time required (or at least desired) for the rendering playback device(s) to process frames and/or packets comprising audio content received from the audio sourcing device for playback.

For an individual frame (or packet) containing a portion(s) of the audio content, the audio sourcing device generates playback timing for that individual frame (or packet) by adding the sum of the "timing offset" and the "timing advance" to a current time of the local clock at the audio sourcing device that the audio sourcing device uses to generate the playback timing for the audio content. In operation, the "timing offset" may be a positive or a negative offset, depending on whether the local clock at the audio sourcing device is ahead of or behind the reference clock providing the reference clock timing. The "timing advance" is a positive number because it represents a future time relative to the local clock time at the audio sourcing device, as adjusted by the "timing offset."

By adding the sum of the "timing advance" and the "timing offset" to a current time of the local clock at the audio sourcing device that the audio sourcing device is using to generate the playback timing for the audio content, the audio sourcing device is, in effect, generating the playback timing relative to the remote reference clock.

In some example configurations, and as described above, the "timing advance" is based on an amount of time that is greater than or equal to the sum of (i) the network transit time required for frames and/or packets comprising audio content transmitted from the audio sourcing device to arrive at the rendering playback device(s) and (ii) the amount of time required for the rendering playback device(s) to process received frames/packets from the audio sourcing device for playback.

In some example configurations, the audio sourcing device determines a timing advance via signaling between the audio sourcing device and the rendering playback device(s), as described previously. Further, in some example configurations, the timing advance is less than about 50 milliseconds, less than about 20-30 milliseconds, or less than about 10 milliseconds, depending on the audio playback latency requirements because different audio may have different latency requirements.

For example, audio associated with video content may have lower latency requirements than audio that is not associated with video content because audio associated with video content must be (or at least should be) synchronized with its corresponding video content whereas audio that is not associated with video content need not be synchronized with any corresponding video content. In some example configurations, the timing advance remains constant after being determined, or at least constant for the duration of a playback session. And in some example configurations, the audio sourcing device can change the timing advance based on further signaling between the audio sourcing device (generating the playback timing) and the rendering playback device(s) using the playback timing to play audio.

As described in more detail below, all the rendering playback devices configured to play the audio content in synchrony will use the playback timing and the reference clock timing to play the audio content in synchrony with each other.

f. Playing Audio Using Local Playback Timing and Local Clock Timing

In some example configurations, the audio sourcing device may be a playback device configured to perform a group coordinator role for a playback group or playback system. In such example configurations, the group coordinator may be further configured to play audio in synchrony with other rendering playback devices. And if the group coordinator is using clock timing from a local clock at the group coordinator to generate the playback timing (i.e., the group coordinator comprises the reference clock that generates the reference clock timing information), then the group coordinator can also play the audio using locally-generated playback timing and the locally-generated reference clock timing. In such example configurations, the group coordinator plays an individual frame (or packet) comprising portions of the audio content when the local reference clock that the group coordinator used to generate the playback timing reaches the time specified in the playback timing for that individual frame (or packet).

For example, recall that when generating playback timing for an individual frame (or packet), the audio sourcing device (which is a group coordinator in some example configurations) adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio content in an individual frame (or packet) 30 milliseconds after creating the playback timing for that individual frame (or packet).

In this manner, an audio sourcing device acting as a group coordinator in such example configurations plays audio based on the audio content by using locally-generated playback timing and clock timing from a local reference clock at the group coordinator. As described further below, by playing the portion(s) of the audio content of an individual frame and/or packet when the clock time of the local reference clock reaches the playback timing for that individual frame or packet, the group coordinator plays that portion(s) of the audio corresponding to the audio content in that individual frame and/or packet in synchrony with the other rendering playback device(s) configured to play that same audio content.

g. Playing Audio Using Local Playback Timing and Remote Clock Timing

As mentioned earlier, in some example configurations, an audio sourcing device generates playback timing for audio content based on clock timing from a remote clock, i.e., a clock at another network device separate from the audio sourcing device, e.g., a reference clock for the playback system, another playback device, or another computing device (e.g., a smartphone, laptop, media server, or other computing device configurable to provide clock timing sufficient for use by a playback device generate playback timing and/or playback audio). For scenarios where the audio sourcing device is also configured to the play the audio, the audio sourcing device uses the reference clock timing from the "remote" clock in connection with playing the audio. In such scenarios, the audio sourcing device plays audio using the locally-generated playback timing in combination with the reference clock timing from the remote clock.

Recall that, in example configurations where the audio sourcing device generates playback timing for audio content based on reference clock timing information from a remote clock, the audio sourcing device generates the playback timing for an individual frame (or packet) based on (i) a "timing offset" that is based on a difference between (a) a local clock at the audio sourcing device and (b) the reference clock timing from the remote reference clock, and (ii) a "timing advance" comprising an amount of time that is greater than or equal to the sum of (a) the network transit time required for frames/packets transmitted from the audio sourcing device to arrive at the rendering playback device(s) and (b) the amount of time required for the rendering playback device(s) to process frames and/or packets comprising audio content (i.e., processed audio content) received from the audio sourcing device for playback. And further recall that the audio sourcing device transmits the generated playback timing to the rendering playback device(s) tasked with playing the audio in synchrony.

In a scenario where the audio sourcing device is configured to play the audio content in synchrony with one or more rendering playback devices, then to play an individual frame (or packet) of audio content in synchrony with the rendering playback device(s), the audio sourcing device subtracts the "timing offset" from the playback timing for that individual frame (or packet) to generate a "local" playback time for playing the audio based on the audio content within that individual frame (or packet). After generating the "local" playback time for playing the portion(s) of the audio corresponding to the audio content within the individual frame (or packet), the audio sourcing device plays the portion(s) of the audio corresponding to the audio content in the individual frame (or packet) when the local clock that the audio sourcing device is using to play the audio content reaches the "local" playback time for that individual frame (or packet). By subtracting the "timing offset" from the playback timing to generate the "local" playback time for an individual frame, the audio sourcing device effectively plays the portion(s) of audio corresponding to the audio content in that frame/packet with reference to the reference clock timing from the remote reference clock.

h. Playing Audio Using Remote Playback Timing and Remote Clock Timing

As mentioned above, an audio sourcing device transmits audio content and playback timing for the audio content to rendering playback device(s), and a reference clock (which may be a component of the audio sourcing device but could also be separate from the audio sourcing device) provides reference clock timing information to rendering playback device(s).

A rendering playback device that receives the audio content, the playback timing, and the reference clock timing information from one or more networked devices (i.e., the audio sourcing device individually or in combination with a reference clock) is configured to play the audio using the playback timing from the device that provided the playback timing (i.e., remote playback timing from the audio sourcing device) and reference clock timing information from a reference clock at the device that provided the reference clock timing (i.e., remote clock timing from the reference clock). In this manner, the rendering playback device in this instance plays audio based on audio content by using remote playback timing and remote reference clock timing information. This is the most typical scenario for the rendering playback device example configurations disclosed and described herein.

To play an individual frame (or packet) of the audio content in synchrony with the other rendering playback devices(s) tasked with playing the audio, the rendering playback device (i) receives the frames (or packets) comprising the portions of the audio content, (ii) receives the playback timing for the audio content (e.g., in the frame and/or packet headers of the frames and/or packets comprising the portions of the audio content or perhaps separately from the frames and/or packets comprising the portions of the audio content), (iii) receives the reference clock timing information, and (iv) plays the portion(s) of the audio content in the individual frame (or packet) when the local rendering clock that the rendering playback device uses for audio playback reaches the playback time specified in the playback timing for that individual frame (or packet), as adjusted by a "timing offset." Some example configurations may additionally or alternatively include adjusting the sample rate of audio content based one or more timing differences between the reference clock (separate from the rendering playback device) and the rendering clock (at the rendering playback device).

In operation, after the rendering playback device receives the reference clock timing information, the rendering playback device determines a "timing offset" for the rendering playback device. This "timing offset" comprises (or at least corresponds to) a difference between the "reference" clock that was used to generate the reference clock timing and a "local" rendering clock at the rendering playback device that the rendering playback device uses to play the audio content. In operation, a playback device that receives the reference clock timing from another device calculates its own "timing offset" based on the difference between its local rendering clock and the reference clock timing information, and thus, the "timing offset" that each rendering playback device determines is specific to that particular rendering playback device.

In some example configurations, when playing audio, the rendering playback device generates new playback timing (specific to the rendering playback device) for individual frames (or packets) of audio content by adding the previously determined "timing offset" to the playback timing for each received frame (or packet) comprising portions of audio content. With this approach, the rendering playback device converts the playback timing for the received audio content into "local" playback timing for the rendering playback device. Because each rendering playback device calculates its own "timing offset," each rendering playback device's determined "local" playback timing for an individual frame is specific to that particular rendering playback device.

And when the "local" rendering clock that the rendering playback device is using for playing back the audio reaches the "local" playback time for an individual frame (or packet), the rendering playback device plays the audio content (or portions thereof) associated with that individual frame (or packet). As described above, in some example configurations, the playback timing for a particular frame (or packet) is in the header of the frame (or packet). In other example configurations, the playback timing for individual frames (or packets) is transmitted separately from the frames (or packets) comprising the audio content.

Because each rendering playback device plays frames (or packets) comprising portions of the audio content according to the playback timing as adjusted by its own "timing offset" relative to the reference clock timing information, and because the audio sourcing device that provides the playback timing also generated the playback timing for those frames (or packets) relative to the reference clock timing information, then each rendering playback device plays the same frames (or packets) comprising the same portions of the audio content in synchrony with all of the other rendering playback devices, i.e., at the same time or at substantially the same time.

In some example configurations, an individual rendering playback device configured to play audio content determines one or more of (i) a difference between the reference clock time and a clock time of the rendering clock at the rendering playback device (and/or vice versa), (ii) a difference between the clock rate of the reference clock and the clock rate of the rendering clock at the rendering playback device (and/or vice versa), and (iii) whether and the extent to which the clock rate of the reference clock has drifted relative to the clock rate of the rendering clock at the rendering playback device (and/or vice versa). In some example configurations, each rendering playback device additionally uses its own determined difference between the clock times, clock rates, and/or clock drift to adjust a sample rate of the audio content to be played in connection with synchronous playback of the audio.

For example, in some example configurations, individual rendering playback devices use one or more of the determined difference(s) between the reference clock timing and the rendering clock timing to facilitate one or both of (i) dropping one or more samples of audio content, e.g., not playing the dropped samples, thus effectively skipping those samples, and/or (ii) adding one or more samples of audio content, e.g., injecting small periods of silence (typically less than 15-20 milliseconds) during playback. By adjusting the sample rate of the audio content to be played based on differences in one or more of the clock times, clock rates, and/or clock drift between the reference clock and the rendering clock, individual rendering playback devices can in some instances facilitate the synchronous playback process by helping to account for the differences in one or more of the clock times, clock rates, and/or clock drift instead of (or in addition to) the timing offsets and timing advances described herein in connection with playing audio based on the playback timing.

In particular, if the rendering clock at the rendering playback device is running faster than the reference clock (i.e., the clock rate of the rendering clock is greater than the clock rate of the reference clock), then the rendering playback device may need to inject a small period of silence during playback of an individual frame of audio content to account for the clock rate difference. Conversely, if the rendering clock at the rendering playback device is running slower than the reference clock (i.e., the clock rate of the rendering clock is less than the clock rate of the reference clock), then the rendering playback device may need to drop (not play) one or more audio samples during playback of an individual frame of audio content to account for the clock rate difference. In this manner, adjusting the sample rate by adding short "silent" samples or dropping audio samples during playback enables the rendering playback device account for minor fluctuations in the clock rates. In some situations, making slight adjustments to the sample rate in this manner enable the rendering playback devices to maintain high-quality synchronous playback without having to set new timing offsets for calculating new "local" playback timing, which could be more disruptive to playback in some instances as compared to minor sample rate adjustments.

VI. Example Configurations

The example configurations described herein include audio sourcing devices configured to generate playback timing based at least in part on reference clock timing information, and rendering playback devices configured to play audio based at least in part on the reference clock timing information and playback timing.

Figure 7:
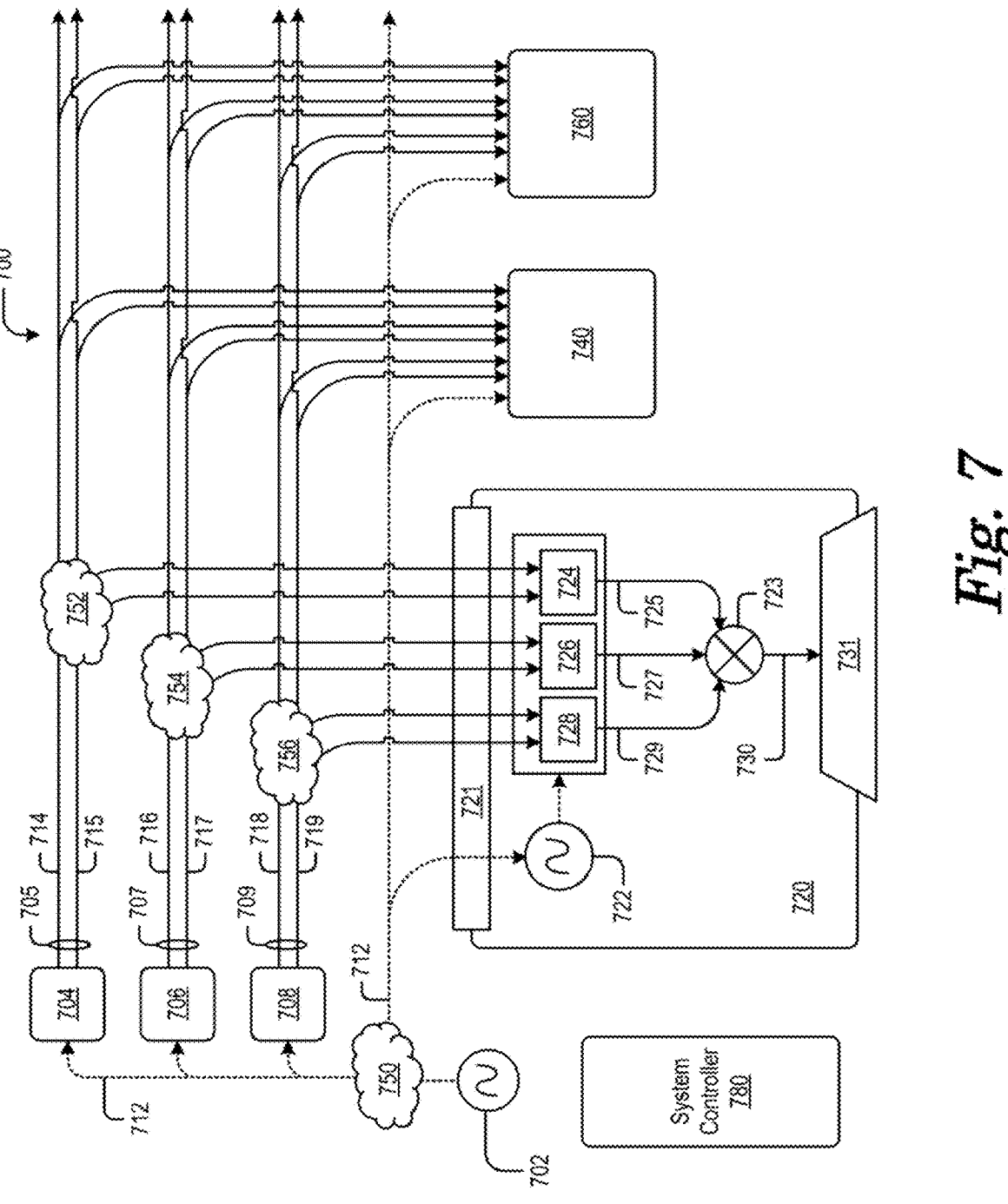
FIG. 7 shows an example configuration of a media playback system according to some example configurations.

FIG. 7 shows an example configuration of a media playback system 700 according to some example configurations. Media playback system 700 comprises (i) a reference clock 702, (ii) several audio sourcing devices 704, 706, and 708 (iii) several rendering playback device 720, 740, and 760, and (iv) a system controller 780.

a. Reference Clock

The reference clock 702 is the same as or similar to the other clock example configurations disclosed and described herein as providing clock timing in connection with (i) generating playback timing and (ii) playing audio content in a groupwise manner.

In the example configuration shown in FIG. 7, the reference clock 702 transmits reference clock timing information 712 to each of the audio sourcing devices 704, 706, and 708, as well as each of the rendering playback devices 720, 740, and 760. The reference clock 702 additionally provide reference clock timing information 712 to the system controller 780 and/or the system controller 780 additionally or alternatively control aspects of the reference clock 702. In some example configurations, the reference clock 702 may be integrated with the system controller 780.

More particularly, in some example configurations, reference clock 702 comprises at least one of (i) a clock at the playback system coordinator 780 of the playback system 700, (ii) a system clock for the playback system 700, (iii) physical clock circuitry within a network device (e.g., the system controller 780, any of the audio sourcing devices 704, 706, and 708 or playback devices 720, 740, and 760, or any other network device), or (iv) a software-based virtual clock within a network (e.g., the system controller 780, any the audio sourcing devices 704, 706, and 708 and playback devices 720, 740, and 760, or any other network device).

In operation, the reference clock 702 is configured to transmit the reference clock timing information 712 to the audio sourcing devices 704, 706, and 708 via any of (i) one or more multicast transmissions from the reference clock 702 via a Wireless Local Area Network (WLAN), (ii) one or more unicast transmissions from the reference clock 702 via the WLAN, (iii) one or more multicast transmissions from the reference clock 702 via a wired LAN, and/or (iv) one or more unicast transmissions from the reference clock 702 via the wired LAN.

For example, in some multicast example configurations, each of the audio sourcing devices 704, 706, and 708 subscribe to a multicast group 750 associated with the reference clock timing information 712, and each of the audio sourcing devices 704, 706, and 708 receive the reference clock timing information 712 via a multicast address corresponding to the multicast group 750 associated with the reference clock timing information 712. Similarly, each of the playback devices 720, 740, and 760 likewise subscribe to the multicast group 750 associated with the reference clock timing information 712, and each of the playback devices 720, 740, and 760 receive the reference clock timing information 712 via the multicast address corresponding to the multicast group 750 associated with the reference clock timing information 712.

However, in other example configurations, the reference clock 702 may instead transmit the reference clock timing information 712 to each audio sourcing device and each rendering playback device separately via individual unicast transmissions addressed to each individual audio sourcing device and rendering playback device.

b. Audio Sourcing Devices

The audio sourcing devices 704, 706, and 708, are the same as or similar to the other audio sourcing device example configurations disclosed and described herein that are configured to provide audio content to one or more playback devices for playback.

As described above, each of the audio sourcing devices 704, 706, and 708 receives or otherwise obtains reference clock timing information 712 from reference clock 702, and each audio sourcing device uses the reference clock timing information 712 to generate playback timing for the audio content that the audio sourcing device provides to rendering playback devices in the playback system 700.

In operation, each audio sourcing device 704, 706, and 708 distributes a data stream (e.g., data streams 705, 707, and/or 709) comprising audio content and playback timing to one or more playback devices (e.g., playback devices 720, 740, and 760) in the playback system 700. In some example configurations, an individual data stream (e.g., any of data streams 705, 707, and/or 709) comprises a series of frames comprising the audio content and the playback timing information for the audio content.

For example, audio sourcing device 704 (i) receives or otherwise obtains reference clock timing information 712 from reference clock 702, and (ii) uses reference clock timing information 712 to generate data stream 705, which includes audio content 715 and playback timing 714 for the audio content 715. In operation, audio sourcing device 704 uses reference clock timing information 712 to generate playback timing 714 for the audio content 715 according to any of the playback timing generation methods disclosed and described herein. Audio content 715 may comprise any one or more types of any of the audio content disclosed and described herein.

Similarly, audio sourcing device 706 (i) receives or otherwise obtains reference clock timing information 712 from reference clock 702, and (ii) uses reference clock timing information 712 to generate data stream 707, which includes audio content 717 and playback timing 716 for the audio content 717. In operation, audio sourcing device 706 uses reference clock timing information 712 to generate playback timing 716 for the audio content 717 according to any of the playback timing generation methods disclosed and described herein. Audio content 717 may comprise any one or more types of any of the audio content disclosed and described herein.

Likewise, audio sourcing device 708 (i) receives or otherwise obtains reference clock timing information 712 from reference clock 702, and (ii) uses reference clock timing information 712 to generate data stream 709, which includes audio content 719 and playback timing 718 for the audio content 719. In operation, audio sourcing device 708 uses reference clock timing information 712 to generate playback timing 718 for the audio content 719 according to any of the playback timing generation methods disclosed and described herein. Audio content 719 may comprise any one or more types of any of the audio content disclosed and described herein.

In some example configurations, individual audio sourcing devices are configured to transmit audio content and playback timing to individual rendering playback devices via one or more (i) multicast transmissions via a wireless local area network (WLAN), (ii) unicast transmissions via the wireless LAN, (iii) multicast transmissions via a wired local area network (LAN), and/or (iv) unicast transmissions via the wired LAN.

In some example configurations, an individual audio sourcing device transmits a data stream comprising audio content and playback timing to a multicast group associated with the audio content, and each playback device configured to play the audio content distributed by that individual audio sourcing device subscribes to the multicast group associated with the audio content distributed by that individual audio sourcing device.

For example, in playback system 700, audio sourcing device 704 transmits data stream 705 to a first multicast group 752. Each playback device 720, 740, and 760 is subscribed to multicast group 752, and thus, each playback device 720, 740, and 760 receives data stream 705 via a multicast address associated with multicast group 752.

Similarly, audio sourcing device 706 transmits data stream 707 to a second multicast group 754. Each playback device 720, 740, and 760 is subscribed to multicast group

754, and thus, each playback device 720, 740, and 760 receives data stream 707 via a multicast address associated with multicast group 754.

Likewise, audio sourcing device 708 transmits data stream 709 to a third multicast group 756. Each playback device 720, 740, and 760 is subscribed to multicast group 756, and thus, each playback device 720, 740, and 760 receives data stream 709 via a multicast address associated with multicast group 756.

Although the example playback system 700 depicted in FIG. 7 shows each playback device 720, 740, and 760 subscribed to the same set of multicast groups 752, 754, and 756, and mixing and playing the same mix of audio content, the playback devices and systems contemplated herein are not so limited. In particular, each rendering playback device is configurable to mix and play audio from any two or more streams such that different rendering playback devices in a systems can be configured to play different combinations of audio from different data streams. For example, in the context of FIG. 7, some alternative configurations include playback device 720 mixing and playing audio from data streams 705 and 707, playback device 740 mixing and playing audio from data streams 707 and 709, and playback device 760 mixing and playing audio from data streams 705 and 709. Further, while three data streams 705, 707, and 709 are shown for illustration, audio sourcing devices and rendering playback devices in a playback system can be configured to process, distribute, mix, and/or play any number of different data streams in any combination.

In some example configurations, a single audio sourcing device is configured to transmit several separate data streams, where each data stream includes separate audio content and related playback timing. In some such example configurations, the single audio sourcing device is configured to transmit each data stream to a separate multicast group.

For example, playback system 700 shows three separate audio sourcing devices 704, 706, and 708. But in alternative example configurations, the audio sourcing devices 704, 706, and 708 may be virtual components of the system controller 780. In some example configurations, the system controller 780 may comprise the reference clock 702 and several audio sourcing instances (e.g., virtual implementations of audio sourcing devices 704, 706, and 708). In still further example configurations, the functions of the system controller 780, the reference clock 702, and the several audio sourcing devices 704, 706, and 708 may be integrated within an individual playback device, such as playback device 720.

c. Rendering Playback Devices

The rendering playback devices 720, 740, and 760 are the same as or similar to any of the other playback device example configurations disclosed and described herein. In some example configurations, one or more of the rendering playback devices 720, 740, and 760 may be configured as a "render only" playback device. In some example configurations, when the rendering playback device is configured as a "render only" playback device, the rendering playback device is configured to play (or "render") audio content, but not configured to (i) source audio content, (ii) distribute audio content to other playback devices, (iii) generate and/or distribute playback timing to other playback devices, or (iv) generate and/or distribute reference clock timing information to other devices in the playback system. However, in some example configurations, one or more of the rendering playback devices 720, 740, and 760 may be configured to source and distribute audio content to other playback devices, distribute reference clock timing information, and/or perform other functions in addition to rendering audio content received from one or more audio content sources.

A "render only" playback device configured for receiving and rendering audio streams can be particularly useful in a playback system like playback system 700 shown in FIG. 7 with a centralized reference clock 702 and several audio sourcing devices. One advantage of such a "render only" playback device is the reduction in complexity compared to existing Sonos playback devices that are configured to implement many different playback roles (and the features and functions associated with each different playback role). In some instances, the useful lifespan of a "render only" playback device may be longer then the useful lifespan of a more complicated playback device because other computationally intensive functions for managing the system and processing audio content can be performed by other devices in the playback system, e.g., the audio sourcing devices (704, 706, and 708), the reference clock 702, and/or the system controller 780.

For example, in a centralized architecture like the example shown in FIG. 7, a "render only" playback device might not need to manage its own playback queue; queue management can instead be performed by an audio sourcing device or the system controller. In such scenarios, a "render only" playback device can just play the audio content it receives via the audio streams to which it is subscribed. Similarly, in some scenarios, a "render only" playback device may not need to authenticate itself with a streaming audio service; authentication can instead be performed by an audio sourcing device or the system controller. However, in other scenarios, a "render only" playback device can still be configured to manage a playback queue and/or authenticate itself with one or more streaming audio services, particularly if it might advantageous for the playback device to do so.

In example playback system 700, each of the rendering playback devices 720, 740, and 760 receives or otherwise obtains (i) reference clock timing information 712 from reference clock 702, (ii) data stream 705 comprising audio content 715 and playback timing 714 from audio sourcing device 704, (iii) data stream 707 comprising audio content 717 and playback timing 716 from audio sourcing device 706, and (iv) data stream 709 comprising audio content 719 and playback timing 718 from audio sourcing device 708. In some example configurations, set of data streams (i.e., 705, 707, and 709) comprises (i) one or more data streams comprising music, (ii) one or more data streams comprising sound effects, and/or (iii) one or more data streams comprising paging content. For example, in some example configurations, data stream 705 comprises a music channel, data stream 707 comprises a sound effects channel, and data stream 709 comprises a paging channel. Other combinations of music, sound effects, and paging channels are possible, too. As mentioned above, in operation, each individual rendering playback device may be configured to receive any one or data streams, mix any combination of audio content from any combination of data streams, and play the mixed audio content.

As described above, in example configurations where each of the audio sourcing devices 704, 706 and 708 transmits a data stream comprising audio content and playback timing to an individual multicast group, each of the rendering playback devices 720, 740 and 760 is configured to receive each data stream via a multicast network address associated with its multicast group.

In example configurations where the reference clock timing information 712 is distributed via one or more multicast transmissions, an audio sourcing device and/or rendering playback device that needs the reference clock timing information 712 must first subscribe to multicast group 750.

Similarly, example configurations where a data stream comprising audio content and playback timing (e.g., data stream 705, 707, and/or 709) is distributed via one or more multicast transmissions, a rendering playback device that needs to receive the data stream must first subscribe to multicast group associated with that data stream. For example, in some multicast example configurations, (i) before a rendering playback device can receive data stream 705, the rendering playback device must first subscribe to multicast group 752, (ii) before a rendering playback device can receive data stream 707, the rendering playback device must first subscribe to multicast group 754, and (iii) before a rendering playback device can receive data stream 709, the rendering playback device must first subscribe to multicast group 756.

In some example configurations, an audio sourcing device (e.g., audio sourcing device 704, 706, and/or 708) and/or a rendering playback device (e.g., rendering playback device 720, 740, and/or 760) subscribes to a multicast group (e.g., multicast groups 750, 752, 754, and/or 756) via the Internet Group Management Protocol (IGMP) and/or Multicast Listener Discovery (MLD) protocols, which enable individual receiving devices to join and leave a multicast group. However, in other example configurations, audio sourcing devices and/or rendering playback devices may subscribe to playback groups via other protocols now known or later developed that are suitable for managing multicast group membership.

In some example configurations, individual rendering playback devices are configured to join multicast groups and/or leave multicast groups based on join and leave commands. For example, rendering playback device 720 may join multicast groups 752 and 754 after receiving (and perhaps in response to receiving) one or more commands to join the multicast groups. After joining multicast groups 752 and 754, rendering playback device 720 is configured to play audio content 715 (associated with multicast group 752) and audio content 716 (associated with multicast group 754). Later, rendering playback device may leave multicast group 754 and join multicast group 756 after receiving (and perhaps in response to receiving) one or more commands to leave multicast group 754 and one or more commands to join multicast group 756. After leaving multicast group 754 and joining multicast group 756, rendering playback device 720 is configured to play audio content 715 (associated with multicast group 752) and audio content 719 (associated with multicast group 754). Still later, rendering playback device 720 may rejoin multicast group 754 after receiving (and perhaps in response to receiving) one or more commands to join multicast group 754. After rejoining multicast group 754, rendering playback device 720 is configured to play audio content 715 (associated with multicast group 753), audio content 718 (associated with multicast group 754), and audio content 719 (associated with multicast group 756).

In some scenarios, a rendering playback device may be configured to join certain multicast groups automatically upon being added to a playback system.

For example, in some scenarios, a rendering playback device may be configured to join a default multicast group corresponding to system-wide configuration and control information. In operation, any rendering playback device added to a playback system that is configured to use a default multicast group for disseminating system-wide configuration and control will receive configuration and control information via that default multicast group.

In another example, a rendering playback device may be configured to automatically join a default multicast group for emergency alert audio (e.g., smoke alarms, fire alarms, system-wide public address, or similar audio) for a playback system. In operation, any rendering playback device added to a playback system that is configured to use the default multicast group for emergency alerts will receive (and play) any and all audio sent to that emergency alert multicast group. In some configurations, a rendering playback device is configured to join the emergency alert multicast group and remain a member of the emergency alert multicast group unless and until the rendering playback device is affirmatively configured to leave the emergency alert multicast group. In some example configurations, a special access code or other special credential may be required to configured the playback device to leave the emergency alert multicast group.

In some scenarios, rendering playback devices can be configured to leave and/or join different multicast group based on certain events, configured groupings, time of day, and/or other triggers or events.

For example, in some scenarios, in some scenarios, a playback grouping may have a set of multicast groups associated therewith, and when a rendering playback device is added to that playback group, the rendering playback device joins the set of multicast groups associated with that playback group. This type of grouping facilitates playback-group level configuration of individual rendering playback devices and enables individual playback devices to be quickly and easily reconfigured if/when moved and/or reconfigured from one playback group to a different playback group.

In another example scenario, individual rendering playback devices (or perhaps playback groups comprising individual rendering playback devices) may be configured to join certain multicast groups during certain times of the day. For example, certain playback devices and/or playback groups in a retail implementation may be configured to automatically join a multicast group associated with particular audio content (e.g., a specific paging channel for announcements or particular music) at certain times during the business day.

In yet another example scenario, some or all rendering playback devices within a playback system in a retail implementation may be configured to automatically join a particular multicast group in response to detecting or determining that a fire alarm, smoke alarm, emergency alert, or other public safety alarm/alert system has been triggered/activated. This type of feature may be advantageous in scenarios where playback devices in a playback system may automatically join a default emergency alert multicast group as described above.

In yet another example scenario, individual rendering playback devices may be configured in some implementations to dynamically join and/or leave multicast groups in response to configuration and/or control commands (including join and/or leave commands) received from any of a system controller (e.g., system controller 780), a controller device (e.g., an smartphone, tablet computer, desktop/laptop computer, or similar computing device) running a software controller application for controlling the playback system, one or more of the audio sourcing devices (e.g., 704, 706, 708), and/or one or more other playback devices.

In some example configurations, the one or more commands to join and/or leave the multicast groups may comprise any (i) one or more commands received via the one or more network interfaces 721 from the system controller 780, (ii) one or more commands received via the one or more network interfaces 721 from a controller device (e.g., a smartphone, tablet, laptop, etc. running a controller application for the playback device) (not shown), (iii) one or more commands received via a local user interface (e.g., a graphical user interface) on the playback device 720, and/or (iv) one or more commands received via button(s), switch(s), dial(s), and/or other physical interfaces on the playback device 720. Because each rendering playback device is configured to join, leave, and/or rejoin multicast groups over time, the set of rendering playback devices rendering any particular combination of audio content associated with multicast groups can change over time. In some example configurations, each rendering playback device can select any available multicast group in the playback system 700 to join.

Example rendering playback device 720 illustrates some of the functional components that are common to all of the example rendering playback devices 720, 740, and 760. In some example configurations, rendering playback devices 720, 740, and 760 include the same or similar functional components such that they all are configured to perform the same or substantially the same features and functions. However, in some example configurations, the rendering playback devices 720, 740, and 760 need not include all of the same functional components or perform all of the same features.

Rendering playback device 720 includes one or more communications interfaces 721 configured for receiving the reference clock timing information 712, data channel 705, data channel 707, and data channel 709. The one or more communications interfaces 721 may include any wireless and or wired communications interface now known or later developed that is suitable for transmitting and receiving data communications between and among networked computing devices. For example, the one or more communications interfaces 721 may include one or more Ethernet network interfaces, one or more Wi-Fi network interfaces, and/or one or more Bluetooth network interfaces.

Rendering playback device 720 also includes local rendering clock 722. Local rendering clock 722 may comprise a physical hardware clock or a software-based virtual clock. In operation, rendering playback device 720 determines one or more of (i) a difference between the clock time of the reference clock 702 and the clock time of the rendering clock 722, (ii) a difference between the clock rate of the reference clock 702 and the clock rate of the rendering clock 722, and/or (iii) whether and the extent to which the clock rate of rendering clock 722 has drifted relative to the clock rate of reference clock 702.

For example, in some example configurations, after rendering playback device 720 has received an indication of a current clock time ($t_1$) of the reference clock 702, rendering playback device 720 records a receipt time ($t_2$) of the rendering clock 722 corresponding to the time at which the rendering playback device 720 received the indication of the current clock time ($t_1$) of the reference clock 702. Next, rendering playback device 720 transmits one or more delay request messages to the reference clock 702. An individual delay request message comprises an identifier corresponding to the delay request message. The identifier corresponding to the delay request message enables a delay response received from the reference clock 702 to be correlated with the delay request transmitted from the rendering playback device 720.

Next, the rendering playback device 720 receives a delay response from the reference clock 702 in response to the delay request message that the rendering playback device 720 previously transmitted to the reference clock 702. The delay response may also include the indication corresponding to the delay request to enable the playback device to correlate the received delay response with the previously transmitted delay request. The delay response received from the reference clock 702 includes an indication of a time ($t_3$) at which the reference clock 702 transmitted the delay response to the rendering playback device 720. After receiving the delay response from the reference clock 702, the rendering playback device 720 records a receipt time ($t_4$) of the rendering clock 722 corresponding to the time at which the rendering playback device 720 received the delay response from the reference clock 702. Then, the rendering playback device 720 calculates a timing offset between the rendering clock 722 and the reference clock 702. In some example configurations, rendering playback device 720 calculates the timing offset between the rendering clock 722 and reference clock 702 according to the equation $((t_2-t_1)+(t_4-t_3))/2$.

In some example configurations, the rendering playback device 720 and the reference clock 702 may additionally or alternatively exchange clock rate information. In particular, in some example configurations, the rendering playback device 720 and the reference clock 702 are configured to: (i) exchange clock time information; (ii) exchange clock rate information; or (iii) exchange both clock time and clock rate information.

In some example configurations, rendering playback device 720 calculates the timing offset between the rendering clock 722 and the reference clock 702 in an ongoing fashion. For example in some example configurations, rendering playback device 720 calculates the timing offset between the rendering clock 722 and the reference clock 702 periodically or at least semi-periodically on a regular or at least ongoing basis. By comparing the calculated timing offsets over time, rendering playback device 720 can determine whether and the extent to which the clock rate of rendering clock 722 may have drifted relative to the clock rate of the reference clock 702.

In operation, rendering playback device 720 uses the determined timing offset between the rendering clock 722 and the reference clock 702 in combination with playback timing to play audio content. For example, in some example configurations, rendering playback device 720 uses the determined timing offset to generate local playback timing for audio content based on playback timing received from an audio sourcing device by adding or subtracting the determined timing offset from a playback time received from the audio sourcing device (i.e., a playback time for an audio sample). In some example configurations, rendering playback device 720 additionally or alternatively adjusts a sample rate (as described earlier) of audio content received from the audio sourcing device based on the determined timing offset, or perhaps a clock rate difference or clock rate drift based upon one or more determined timing offsets between the rendering clock 722 and the reference clock 702.

In the example shown in FIG. 7, for each of the data streams 705, 707, and 709, the rendering playback device 702 generates sample-rate adjusted audio content for the data stream by adjusting a sample rate of at least a portion of the audio content of the data stream to compensate for a difference between the rendering clock 722 at the rendering playback device 720 and the reference clock 702. The difference between the rendering clock 722 at the rendering playback device 720 and the reference clock 702 may include one or both of (i) a clock time difference between the clock time at the rendering clock 722 and the clock time at the reference clock 702, and/or (i) a clock rate difference between the clock rate of the rendering clock 722 and the clock rate of the reference clock 702.

Rendering playback device 720 also includes audio processing stages 724, 726, and 728 that are configured to process incoming data streams 705, 707, and 709, respectively. In operation, each audio processing stage 724, 726, and 728 generates respective sample-rate adjusted audio 725, 727, and 729 that is provided to mixer 723. The mixer 723 mixes (e.g., combines) the sample-rate adjusted audio streams 725, 727, and 729 into an audio stream 730 for playback by the rendering playback device 720 via one or more speakers 731.

For example, rendering playback device 720 provides the audio content 715 and playback timing information 714 of data stream 705 to audio processing stage 724 where rendering playback device 720 (i) generates sample-rate adjusted audio content 725 based on audio content 715 and (ii) provides the sample-rate adjusted audio content 725 to mixer 723 for mixing with the other sample rate adjusted audio streams 727 and 729 to generate audio stream 730 for playback via one or more speakers 731.

Similarly, rendering playback device 720 provides the audio content 717 and playback timing information 716 of data stream 707 to audio processing stage 726 where rendering playback device 720 (i) generates sample-rate adjusted audio content 727 based on audio content 717 and (ii) provides the sample-rate adjusted audio content 727 to mixer 723 for mixing with the other sample rate adjusted audio streams 725 and 729 to generate audio stream 730 for playback via the one or more speakers 731.

Likewise, rendering playback device 720 also provides the audio content 719 and playback timing information 718 of data stream 709 to audio processing stage 728 where rendering playback device 720 (i) generates sample-rate adjusted audio content 729 based on audio content 719 and (ii) provides the sample-rate adjusted audio content 729 to mixer 723 for mixing with the other sample rate adjusted audio streams 725 and 727 to generate audio stream 730 for playback via the one or more speakers 731.

In some example configurations, rendering playback device 720 is configured to mix the sample-rate adjusted audio content of two or more data streams based on mixing instructions received from the playback system controller 780. In some example configurations, the playback system controller 780 provides mixing instructions to each of the rendering playback devices 720, 740, and 760 to control the mixing of the sample-rate adjusted audio content 725, 727, and 729 at each rendering playback device.

In some example configurations, the mixing instructions from the playback system controller 780 control relative volume levels of the individual sample-rate adjusted audio content 725, 727, and 729 streams within the final audio stream 730 for playback via the one or more speakers 731. In operation, by controlling volume levels of the individual sample-rate adjusted audio content 725, 727, and 729 streams within the final audio stream 730 at individual rendering playback devices, the system controller 780 can "steer" sound within playback system 700, for example, by making sound appear to emanate from different locations within the listening area in which the playback system 700 is operating. For example, if data stream 709 comprises a sound effect corresponding to a flying animal, the system controller 780 can increase and/or decrease the volume of the sample-rate adjusted audio content 729 played at different rendering playback devices as a function of time so that the sound effect experienced by listeners approximates the sound of the animal flying though the listening area in which the playback system 700 is operating.

In some example configurations, the mixing instructions from the playback system controller 780 additionally or alternatively control playback delays of the individual sample-rate adjusted audio content 725, 727, and 729 streams within the final audio stream 730 for playback via the one or more speakers 731 to add a surround sound and/or other directional sound effect to one or more of the individual sample-rate adjusted audio content 725, 727, and 729 streams. For example, if data stream 709 comprises a sound effect corresponding to the flying animal, the system controller 780 can instruct individual rendering playback devices to introduce delays into the sample-rate adjusted audio content 729 played at the rendering playback devices as a function of time so that the sound effect experienced by listeners approximates the sound of the animal flying though the listening area in which the playback system 700 is operating. When used in combination with controlling the playback volume, introducing delays can further enhance the surround sound and/or directional effect of the audio playback experienced by listeners.

In some example configurations, individual rendering playback devices are configurable to play audio content in different playback configurations within the playback system 700.

For instance, in one example scenario, rendering playback devices 740 and 760 are configured to play audio content in a stereo pair configuration with rendering playback device 740 functioning as the stereo pair primary player and rendering playback device 760 functioning as the stereo pair secondary player. Rendering playback device 720 may be configured to play audio in synchrony with the stereo pair comprising rendering playback devices 740 and 760. In some example configurations of this example scenario, while the rendering playback device 740 is configured as the stereo pair primary player, the rendering playback 740 may be configured to provide processed audio content to rendering playback device 760 for playback (rather than rendering playback device 760 obtaining audio content directly from the audio sourcing devices as shown in FIG. 7), and rendering playback device 740 may be additionally configured to control one or more functions (e.g., volume, delay, playback start/stop) of rendering playback device 760. In some example configurations, rendering playback device 740 controlling one or more functions of rendering playback device 760 may include rendering playback device 740 receiving one or more control instructions from system controller 780 (or another controller device or system), and rendering playback device 740 one or more of (i) generating and transmitting one or more new control instructions to rendering playback device 760, and/or (ii) relaying the one or more received control instructions to rendering playback device 760. However, in other example configurations of this example scenario, rendering playback devices 740 and 760 may receive audio from audio sourcing devices as shown in FIG. 7 while rendering playback device 740 is configured to control one or more functions (e.g., volume, delay, playback start/stop) of rendering playback device 760.

In another example scenario, rendering playback device 720 may be configured to operate as a home theater head end (e.g., a soundbar or similar front speaker device and/or home theater controller) while rendering playback devices 740 and 760 are configured as right and left channel surround sound satellite speakers, respectively. In some example configurations of this example scenario, while the rendering playback device 720 is configured as the home theater head end, the rendering playback 720 may be configured to provide processed audio content to rendering playback devices 740 and 760 for playback (rather than rendering playback devices 740 and 760 obtaining audio content directly from the audio sourcing devices as shown in FIG. 7), and rendering playback device 720 may be additionally configured to control one or more functions (e.g., volume, delay, playback start/stop) of rendering playback devices 740 and 760 functioning as the home theater satellite speakers. However, in other example configurations of this example scenario, rendering playback devices 740 and 760 may receive audio from audio sourcing devices as shown in FIG. 7 while rendering playback device 720 is configured to control one or more functions (e.g., volume, delay, playback start/stop) of rendering playback devices 740 and 760.

In yet another example, rendering playback device 720 (comprising full-range speakers) and rendering playback device 740 (comprising a subwoofer) may be configured in a bonded group configuration where rendering playback device 720 is the bonded group primary player and rendering playback device 740 is the bonded group secondary player. In some example configurations of this example scenario, while the rendering playback device 720 is configured as the bonded group primary player, the rendering playback 720 may be configured to provide processed audio content to rendering playback device 740 for playback (rather than rendering playback device 740 obtaining audio content directly from the audio sourcing devices as shown in FIG. 7), and rendering playback device 720 may be additionally configured to control one or more functions (e.g., volume, delay, playback start/stop) of rendering playback device 740 functioning as the bonded group secondary player. However, in other example configurations of this example scenario, rendering playback device 740 may receive audio from audio sourcing devices as shown in FIG. 7 while rendering playback device 720 is configured to control one or more functions (e.g., volume, delay, playback start/stop) of rendering playback device 740.

In some of the aforementioned example configurations where a first rendering playback device is configured to control one or more functions of a second rendering playback device, the first rendering playback controlling one or more functions of the second rendering playback device may include the first playback device receiving one or more control instructions from a system controller 780 (or other controller device or system), and the first rendering playback device either or both (i) generating and transmitting one or more new control instructions to the second rendering playback device and/or (ii) relaying the one or more received control instructions to the second rendering playback device. For example, rendering playback device 740 controlling one or more functions of rendering playback device 760 may include rendering playback device 740 receiving one or more control instructions from system controller 780, and rendering playback device 740 one or more of (i) generating and transmitting one or more new control instructions to rendering playback device 760, and/or (ii) relaying the one or more received control instructions to rendering playback device 760.

In some example configurations, individual rendering playback devices are configurable to operate as different types of rendering playback devices (e.g., rendering only playback device, home theater head end, home theater satellite, stereo pair primary player, stereo pair secondary player, bonded group primary player, bonded group secondary player, and so on) based on one or more software applications that are downloaded to and executed by the individual rendering playback device. For example, to operate as a bonded group primary player, an individual rendering playback device downloads a software application that includes program instructions executable by one or more processors of the playback device that cause that individual playback device to perform bonded group primary player functions. And if that individual playback device later needs to perform a different function in the playback system 700, such as a home theater satellite, then that individual playback device downloads another software application with program instructions executable by the one or more processors of the playback device that cause that individual playback device to perform the home theater satellite functions.

For example, while executing a first software application package corresponding to a first rendering playback device type in the playback system 700, an individual playback device may receive a command to switch from operating as the first playback device type to operating as a second playback device type. And after receiving the command to switch from operating as the first playback device type to operating as the second playback device type, the individual playback device in some example configurations is configured to (i) obtain a second software application package corresponding to the second playback device type, (ii) execute the second software application package corresponding to the second playback device type, and (iii) cease execution of the first software application package corresponding to the first playback device type.

In another example, an individual rendering playback device can be configured to operate as a playback "target" such as an Apple Airplay target, a Google Chromecast or Google Cast target, an Amazon Cast target, a PS Audio DirectStream target, a Bluetooth target, and/or as a playback target for any other audio sourcing application. When configured as a playback target for an audio sourcing application, the rendering playback device is configured to play audio content sourced by the audio sourcing application (e.g., Airplay, Chromecast, Cast, DirectStream, Bluetooth, and so on).

In some scenarios, to function as a playback target for a particular audio sourcing application, a rendering playback device downloads and executes an application package corresponding to the particular audio sourcing application. For example, to function as an Apple Airplay target, the rendering playback device downloads and executes an application package that configures the rendering playback device to function as an apple airplay target. Similarly to function as a Chromecast target, the rendering playback device downloads and executes an application package that configures the rendering playback device to function as a Chromecast playback target.

In some example configurations, the rendering playback device is configured to execute the application package corresponding to the particular audio sourcing application (e.g., Airplay, Chromecast, Bluetooth, and so on) while the rendering playback device is configured to function as a target playback device for that particular audio sourcing application (e.g., while the rendering playback device is configured to play audio from an Airplay, Chromecast, or Bluetooth source). And when the rendering playback device no longer needs to function as a target playback device for that particular audio sourcing application, the rendering playback device can cease execution of the application package corresponding to that particular audio sourcing application. For example, at the end of an Airplay session (or Chromecast, Bluetooth, or similar playback session), the rendering playback device can cease execution of the Airplay application package (or Chromecast, Bluetooth, or similar application package).

VII. Example Methods

Figure 8:
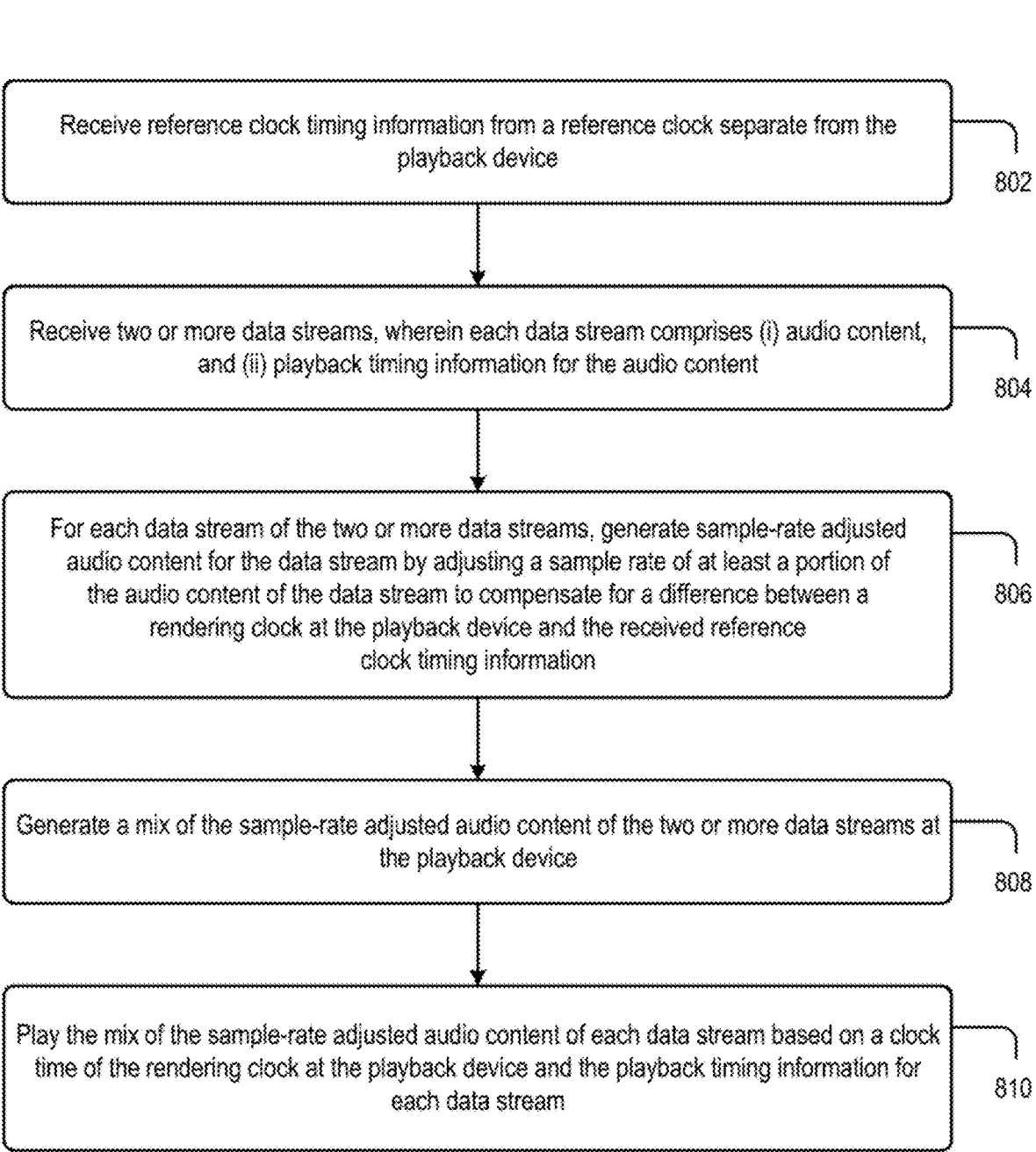
FIG. 8 shows an example method according to some example configurations.

FIG. 8 shows an example method 800 according to some example configurations. Method 800 may be performed by any one or more (or all) of the rendering playback devices 720, 740, and 760 shown and described with reference to playback system 700 (FIG. 7).

Method 800 begins at method block 802 which includes a playback device, while operating as a rendering playback device in a playback system, receiving reference clock timing information from a reference clock separate from the playback device. In some example configurations, the reference clock may be similar to or the same as reference clock 702 shown and described with reference to FIG. 7. For example, in some example configurations, the reference clock comprises at least one of (i) a clock at a playback system controller of the playback system, (ii) a playback system clock, (iii) physical clock circuitry, or (iv) a software-based virtual clock.

In some example configurations, the reference clock timing information may be the same as or similar to reference clock timing information 712 shown in described with reference to FIG. 7. In some example configurations, receiving the reference clock timing information from the reference clock at block 802 includes receiving the reference clock timing information from the reference clock via one of (i) a multicast transmission from the reference clock via a wireless Local Area Network (WLAN), (ii) a unicast transmission from the reference clock via the WLAN, (iii) a multicast transmission from the reference clock via a wired local area network (LAN), or (iv) a unicast transmission from the reference clock via the wired LAN.

Next, method 800 advances to method block 804 which includes the playback device receiving two or more data streams, wherein each data stream comprises (i) audio content, and (ii) playback timing information for the audio content. In some example configurations, the data streams comprising audio content and playback timing may be similar to or the same as any of data streams 705, 707, and/or 709 shown and described with reference to FIG. 7. For example, the set of two or more data streams in some example configurations may comprise (i) one or more data streams comprising music, (ii) one or more data streams comprising sound effects, and/or (iii) one or more data streams comprising paging content.

In some example configurations, receiving two or more data streams at method block 804 includes the playback device receiving the two or more data streams via one or more of (i) a multicast transmission via the WLAN, (ii) a unicast transmission via the WLAN, (iii) a multicast transmission via the wired LAN, or (iv) a unicast transmission via the wired LAN. For example, in some example configurations, the playback device may receive one of the two or more data streams via a multicast transmission via the wired LAN, the playback device may receive another of the two or more data streams via a unicast transmission via the wireless LAN, and so on.

Next, method 800 advances to block 806 which includes, for each data stream of the two or more data streams, generating sample-rate adjusted audio content for the data stream by adjusting a sample rate of at least a portion of the audio content of the data stream to compensate for a difference between a rendering clock at the playback device and the received reference clock timing information. In some example configurations, the difference between the rendering clock at the playback device and the received reference clock timing information corresponds to at least one of (i) a difference between the reference clock time and the clock time of the rendering clock at the rendering playback device (and/or vice versa), (ii) a difference between the clock rate of the reference clock and the clock rate of the rendering clock at the rendering playback device (and/or vice versa), and (iii) whether and the extent to which the clock rate of the reference clock has drifted relative to the clock rate of the rendering clock at the rendering playback device (and/or vice versa). In operation, the playback device performs the block 806 step of generating the sample-rate adjusted audio content for the data stream according to any of the sample rate adjustment methods disclosed and described herein.

In connection with block 806, some example configurations the include the playback device determining the difference between the rendering clock at the playback device and the reference clock via exchanging a series of signaling messages between the playback device and the reference clock. For example, in some example configurations, the playback device receives an indication of a current clock time ($t_1$) of the reference clock. The playback may first request the indication of the current clock time ($t_1$) of the reference clock, or the reference clock may transmit its current clock time on a regular or semi-regular basis in a manner that enables all playback devices to receive the indication of the current clock time ($t_1$) of the reference clock.

After receiving the indication of the current clock time ($t_1$) of the reference clock, the playback device records a receipt time ($t_2$) of the rendering clock corresponding to the time (at the rendering clock) at which the playback device received the indication of the current clock time ($t_1$) of the reference clock. Then, the playback device transmits a delay request message to the reference clock. This delay request message includes an identifier corresponding to the delay request message so that one or both of the playback device and/or the reference clock can match the delay request from the playback device with a delay response from the reference clock.

After sending the delay request to the reference clock, the playback device receives a delay response from the reference clock. This delay response includes an indication of a time ($t_3$) at which the reference clock transmitted the delay response along with perhaps the identifier corresponding to the delay request to which the delay response is responsive. The playback device records a receipt time ($t_4$) at which the playback device received the delay response from the reference clock.

Next, the playback device calculates a timing difference between the rendering clock and the reference clock based on $t_1$, $t_2$, $t_3$, and $t_4$. In some example configurations, the playback device calculates the timing difference between the rendering clock and the reference clock based on $t_1$, $t_2$, $t_3$, and $t_4$ according to the equation $((t_2-t_1)+(t_4-t_3))/2$.

In operation, this timing difference corresponds to the difference between the reference clock time and the clock time of the rendering clock at the rendering playback device (and/or vice versa). In some example configurations, the playback device uses this timing difference as the "timing offset" for converting received playback timing into "local" playback timing as described above.

In some example configurations, the block 806 step of generating the sample-rate adjusted audio content for the data stream by adjusting the sample rate of at least a portion of the audio content of the data stream to compensate for the difference between the rendering clock at the playback device and the received reference clock timing information includes generating the sample-rate adjusted audio content for the data stream based on the difference between the reference clock time and the clock time of the rendering clock at the playback device.

Some example configurations include the playback device determining the timing difference between the rendering clock and the reference clock several times, e.g., several times per second, several times per minute, and/or several times per hour. In operation, the playback device can use several calculated timing differences to determine a difference between the clock rate of the reference clock and the clock rate of the rendering clock at the rendering playback device (and/or vice versa). In some example configurations, the block 806 step of generating the sample-rate adjusted audio content for the data stream by adjusting the sample rate of at least a portion of the audio content of the data stream to compensate for the difference between the rendering clock at the playback device and the received reference clock timing information includes generating the sample-rate adjusted audio content for the data stream based on the difference between the clock rate of the reference clock and the clock rate of the rendering clock at the playback device.

Some example configurations include the playback device determining whether and the extent to which the clock rate of the reference clock has drifted relative to the clock rate of the rendering clock at the rendering playback device (and/or vice versa). In some example configurations, the playback device determines whether and the extent to which the clock rate of the reference clock has drifted relative to the clock rate of the rendering clock at the rendering playback device by comparing several determined differences between the clock rate of the rendering clock and the clock rate of the reference clock. In some example configurations, the block 806 step of generating the sample-rate adjusted audio content for the data stream by adjusting the sample rate of at least a portion of the audio content of the data stream to compensate for the difference between the rendering clock at the playback device and the received reference clock timing information includes generating the sample-rate adjusted audio content for the data stream based on the drift of the clock rate of the rendering clock at the playback device relative to the clock rate of the reference clock.

Next method 800 advances to method block 808 which includes the playback device generating a mix of the sample rate adjusted audio content of the two or more data streams received at the playback device. In some example configurations, block 808 includes the playback device mixing the sample-rate adjusted audio content of the two or more data streams based on mixing instructions received from a playback system controller separate from the playback device according to any of the mixing instructions described earlier, including but not limited to mixing instructions related to controlling relative volumes of the different audio streams at the playback device and/or controlling playback delays of the different audio streams at the playback device.

Next, method 800 advances to method block 810 which includes the playback device playing the mix of the sample rate adjusted audio content for each data stream based on a clock time of the rendering clock at the playback device and the playback timing information for each data stream.

Figure 9:
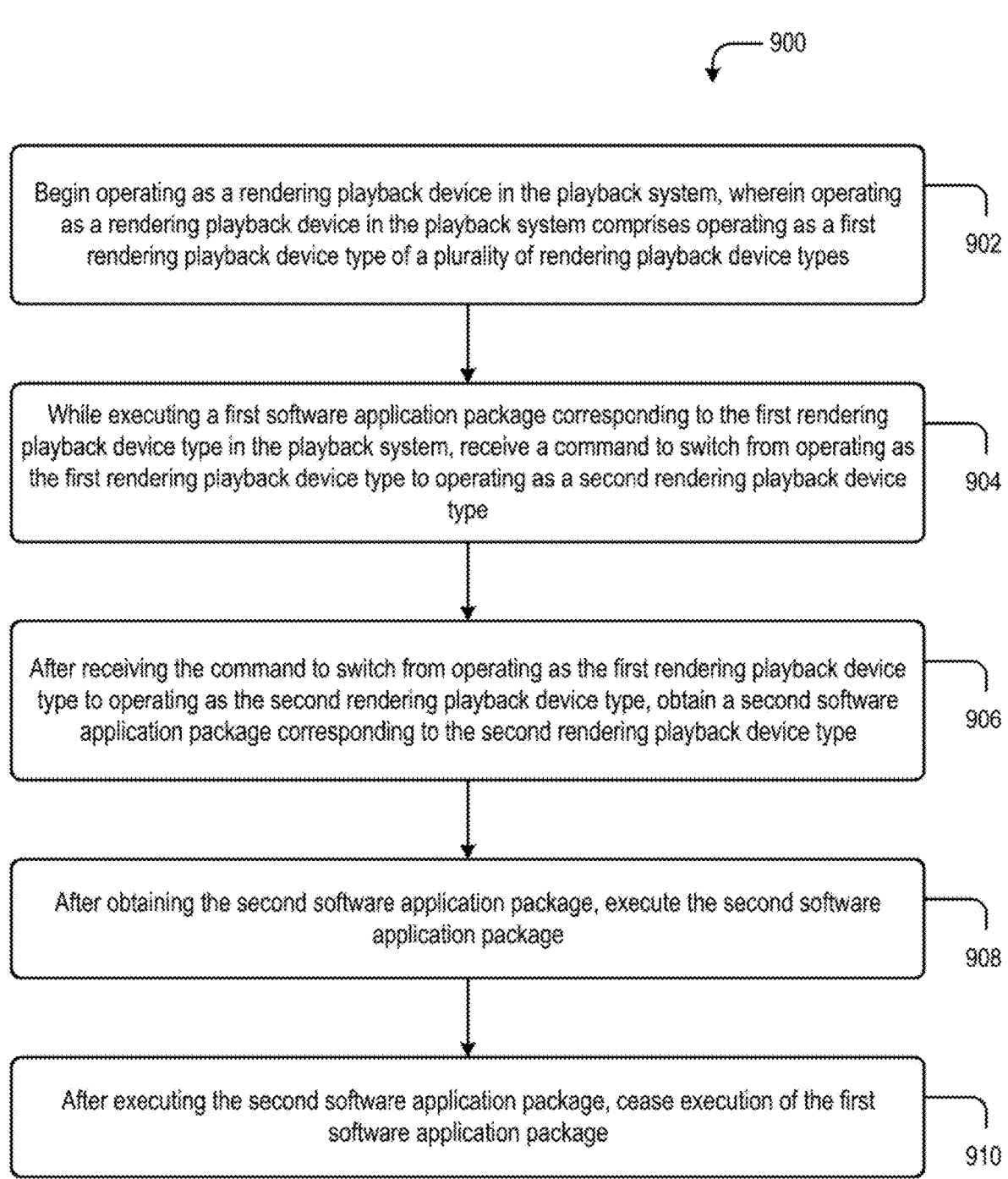
FIG. 9 shows an example method according to some example configurations.

FIG. 9 shows an example method 900 according to some example configurations. In operation, method 900 is performed by any of the playback devices disclosed and described herein, including but not limited to any of playback devices 720, 740, and/or 760 (FIG. 7).

Method 900 begins at method block 902 which includes a playback device beginning to operate as a rendering playback device in the playback system, such as playback system 700. In operation, the playback device operating as a rendering playback device in the playback system comprises operating as a first rendering playback device type of a plurality of rendering playback device types. In some example configurations, the plurality of rendering playback device types comprises one or more of (i) a render only playback device, (ii) a synchrony group coordinator, (iii) a synchrony group member, (iv) a home theater head end, (v) a home theater satellite, (vi) a stereo pair primary player, (vii) a stereo pair secondary player, (viii) a bonded group primary player, (ix) a bonded group secondary player, (x) a playback system coordinator, (xi) a playback system primary player, or (xii) a playback system secondary player. The plurality of rendering playback device types may include other types of rendering playback devices as well.

Next, method 900 advances to method block 904 which includes, while executing the first software application package corresponding to the first rendering playback device type in the playback system, receiving a command to switch from operating as the first rendering playback device to operating as a second rendering playback device type. In operation, the playback device may receive the command to switch from operating as the first rendering playback device to operating as a second rendering playback device type from any of (i) the system controller (e.g., system controller 780), (ii) a different controller device (e.g., smartphone, tablet, and/or other computing device configured to control the playback device), (iii) another playback device in the playback system, and/or (iv) an audio sourcing device.

Next, method 900 advances to method block 906 which includes, after the playback device has received the command to switch from operating against a person rendering playback device type to operating as the second rendering playback device type, the playback device obtaining a second software application package corresponding to the second rendering playback device type. In some example configurations, the playback device may obtain the second software application package from the system controller (e.g., system controller 780) or another computing device or computing system configured to provide rendering playback device software application packages to playback devices.

Next, method 900 advances to method block 908 which includes, the playback device executing the second software application package after obtaining the second software application package. In operation, executing the second software package causes the playback device to begin operating as the second rendering playback device type.

Next, method 900 advances to method block 910 which includes the playback device ceasing execution of the first software application package after executing (or at least beginning to execute) the second software application package. In operation, ceasing execution of the first software application package causes the playback device to cease operating as the first rendering playback device type.

In some example configurations, the playback device may alternatively perform the functions of block 910 (ceasing execution of the first software application) before performing the functions of block 908 (executing (or beginning execution of) the second software application). Further, in some example configurations, the playback device may perform aspects of blocks 908 and 910 concurrently. For example, in some example configurations, the playback device may start execution of the second software application while continuing to execute the first software application, the playback device may execute both the first software application and the second software application for some duration of time (e.g., about a second, a few seconds, a few minutes, or perhaps longer), and then later cease execution of the first software application.

Thus, by executing method 900, a rendering playback device is configurable to perform different rendering playback device roles, and to switch between performing different rendering playback device roles, depending on the desired system configuration. Further, individual rendering playback devices can change their roles in the playback system as the playback system configuration is changed, or perhaps change their roles in the playback system to implement different playback system configurations.

In contrast to existing approaches where upgrading a playback device requires downloading and installing a comparatively large software file that includes software for performing all the different playback roles (and the features associated therewith), upgrading a playback device with new software requires downloading only the individual software application required for performing the current playback role of the playback device.

VIII. Conclusions

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative example configurations mutually exclusive of other example configurations. As such, the example configurations described herein, explicitly and implicitly understood by one skilled in the art, can be combined with other example configurations.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain example configurations of the present disclosure can be practiced without certain, specific details. In other instances, well known methods, procedures, components, and circuitry have not been described in detail to avoid unnecessarily obscuring aspects of the example configurations. Accordingly, the scope of the present disclosure is defined by the appended claims rather than the foregoing description of example configurations.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A playback device comprising:
one or more processors; and
tangible, non-transitory computer-readable media comprising program instructions executable by the one or more processors such that the playback device is configured to:
while the playback device is operating as a rendering playback device in a playback system, receive reference clock timing information from a reference clock separate from the playback device;
receive two or more data streams, wherein each data stream comprises (i) audio content, and (ii) playback timing information for the audio content;
for each data stream of the two or more data streams, generate sample-rate adjusted audio content for the data stream by adjusting a sample rate of at least a portion of the audio content of the data stream to compensate for a difference between a rendering clock at the playback device and the received reference clock timing information;
generate a mix of the sample-rate adjusted audio content of the two or more data streams at the playback device; and
play the mix of the sample-rate adjusted audio content of each data stream based on a clock time of the rendering clock at the playback device and the playback timing information for each data stream.

2. The playback device of claim 1, wherein the reference clock comprises at least one of (i) a clock at a playback system coordinator of the playback system, (ii) a playback system clock, (iii) physical clock circuitry, or (iv) a software-based virtual clock.

3. The playback device of claim 1, wherein the program instructions executable by the one or more processors such that the playback device is configured to receive two or more data streams comprise program instructions executable by the one or more processors such that the playback device is configured to:

60 for each data stream, join a multicast group corresponding to the data stream.

4. The playback device of claim 3, wherein the program instructions executable by the one or more processors such that the playback device is configured to, for each data stream, join a multicast group corresponding to the data stream comprise program instructions executable by the one or more processors such that the playback device is configured to:
for each multicast group, select the multicast group from a set of available multicast groups provided by the playback system.

5. The playback device of claim 3, wherein the program instructions executable by the one or more processors such that the playback device is configured to, for each data stream, join a multicast group corresponding to the data stream comprise program instructions executable by the one or more processors such that the playback device is configured to:
join the multicast group corresponding to the data stream after receiving one or more group selection instructions, wherein an individual group selection instruction is received via at least one of (i) a network interface of the playback device from a network device that is separate from the playback device, (ii) the network interface of the playback device from another playback device, or (iii) a user interface on the playback device, wherein the user interface on the playback device comprises one or more of a button, a switch, or a touchscreen.

6. The playback device of claim 1, wherein the program instructions comprise further program instructions executable by the one or more processors such that the playback device is further configured to:
after receiving an indication of a current clock time $(t_1)$ of the reference clock, (i) record a receipt time $(t_2)$ of the rendering clock of when the playback device received the indication of the current clock time of the reference clock, and (ii) transmit a delay request message from the playback device to the reference clock, wherein the delay request message comprises an identifier corresponding to the delay request message; and
after receiving a delay response from the reference clock in response to the delay request message, wherein the delay response comprises an indication of a time $(t_3)$ when the reference clock transmitted the delay response, (i) record a receipt time $(t_4)$ of the rendering clock of when the playback device received the delay response from the reference clock, and (ii) calculate a timing offset between the rendering clock and the reference clock according to $((t_2-t_1)+(t_4-t_3))/2$.

7. The playback device of claim 1, wherein the program instructions executable by the one or more processors such that the playback device is configured to receive clock timing information from a reference clock separate from the playback device comprise program instructions executable by the one or more processors such that the playback device is configured to receive clock timing information from the reference clock separate from the playback device via one of (i) a multicast transmission from the reference clock via a wireless Local Area Network (LAN), (ii) a unicast transmission from the reference clock via the wireless LAN, (iii) a multicast transmission from the reference clock via a wired LAN, or (iv) a unicast transmission from the reference clock via the wired LAN; and
wherein the program instructions executable by the one or more processors such that the playback device is configured to receive two or more data streams comprise program instructions executable by the one or more processors such that the playback device is configured to receive each data stream of the two or more data streams via a respective one of (i) a multicast transmission via the wireless LAN, (ii) a unicast transmission via the wireless LAN, (iii) a multicast transmission via a wired LAN, or (iv) a unicast transmission via the wired LAN.

8. The playback device of claim 1, wherein the two or more data streams comprise at least two data streams selected from a set of data streams comprising (i) one or more data streams comprising music, (ii) one or more data streams comprising sound effects, and (iii) one or more data streams comprising paging content.

9. The playback device of claim 1, wherein the program instructions executable by the one or more processors such that the playback device is configured to generate a mix of the sample-rate adjusted audio content of the two or more data streams at the playback device comprise program instructions executable by the one or more processors such that the playback device is configured to:

mix the sample-rate adjusted audio content of the two or more data streams at the playback device based on mixing instructions received from a playback system coordinator separate from the playback device.

10. The playback device of claim 1, wherein the program instructions comprise further program instructions executable by the one or more processors such that the playback device is configured to:

begin operating as a rendering playback device in the playback system, wherein operating as a rendering playback device in the playback system comprises operating as a first rendering playback device type of a plurality of rendering playback device types, wherein each rendering playback device type corresponds to a different playback role in the playback system, and wherein the plurality of rendering playback device types comprises one or more of (i) a render only playback device, (ii) a synchrony group coordinator, (iii) a synchrony group member, (iv) a home theater head end, (v) a home theater satellite, (vi) a stereo pair primary player, (vii) a stereo pair secondary player, (viii) a bonded group primary player, (ix) a bonded group secondary player, (x) a playback system coordinator, (xi) a playback system primary player, or (xii) a playback system secondary player.

11. The playback device of claim 10, wherein a particular rendering playback device type corresponds to a software application package comprising program instructions executable by the one or more processors such that the playback device is configured to operate as the particular rendering playback device type, and wherein the program instructions comprise further program instructions executable by the one or more processors such that the playback device is configured to:

while executing a first software application package corresponding to the first rendering playback device type in the playback system, receive a command to switch from operating as the first rendering playback device type to operating as a second rendering playback device type; and after receiving the command to switch from operating as the first rendering playback device type to operating as the second rendering playback device type, (i) obtain a second software application package corresponding to the second rendering playback device type, (ii) execute the second software application package, and (iii) cease execution of the first software application package.

12. The playback device of claim 1, wherein an individual data stream of the two or more data streams comprises a series of frames comprising the audio content and the playback timing information for the audio content.

13. Tangible, non-transitory computer-readable media comprising program instructions executable by one or more processors such that a playback device is configured to perform functions comprising:

while the playback device is operating as a rendering playback device in a playback system, receiving reference clock timing information from a reference clock separate from the playback device;

receiving two or more data streams, wherein each data stream comprises (i) audio content, and (ii) playback timing information for the audio content;

for each data stream of the two or more data streams, generating sample-rate adjusted audio content for the data stream by adjusting a sample rate of at least a portion of the audio content of the data stream to compensate for a difference between a rendering clock at the playback device and the received reference clock timing information;

generating a mix of the sample-rate adjusted audio content of the two or more data streams at the playback device; and playing the mix of the sample-rate adjusted audio content of each data stream based on a clock time of the rendering clock at the playback device and the playback timing information for each data stream.

14. The tangible, non-transitory computer-readable media of claim 13, wherein the reference clock comprises at least one of (i) a clock at a playback system coordinator of the playback system, (ii) a playback system clock, (iii) physical clock circuitry, or (iv) a software-based virtual clock.

15. The tangible, non-transitory computer-readable media of claim 13, wherein receiving two or more data streams comprises for each data stream, joining a multicast group corresponding to the data stream.

16. The tangible, non-transitory computer-readable media of claim 15, wherein for each data stream, joining a multicast group corresponding to the data stream comprises for each multicast group, selecting the multicast group from a set of available multicast groups provided by the playback system.

17. The tangible, non-transitory computer-readable media of claim 15, wherein for each data stream, joining a multicast group corresponding to the data stream comprises joining the multicast group corresponding to the data stream after receiving one or more group selection instructions, wherein an individual group selection instruction is received via at least one of (i) a network interface of the playback device from a network device that is separate from the playback device, (ii) the network interface of the playback device from another playback device, or (iii) a user interface on the playback device, wherein the user interface on the playback device comprises one or more of a button, a switch, or a touchscreen.

18. The tangible, non-transitory computer-readable media of claim 13, wherein the functions further comprise:

after receiving an indication of a current clock time ($t_1$) of the reference clock, (i) recording a receipt time ($t_2$) of the rendering clock of when the playback device received the indication of the current clock time of the reference clock, and (ii) transmitting a delay request message from the playback device to the reference clock, wherein the delay request message comprises an identifier corresponding to the delay request message; and after receiving a delay response from the reference clock in response to the delay request message, wherein the delay response comprises an indication of a time ($t_3$) when the reference clock transmitted the delay response, (i) recording a receipt time ($t_4$) of the rendering clock of when the playback device received the delay response from the reference clock, and (ii) calculating a timing offset between the rendering clock and the reference clock according to $((t_2-t_1)+(t_4-t_3))/2$.

19. The tangible, non-transitory computer-readable media of claim 13, wherein receiving clock timing information from a reference clock separate from the playback device comprises receiving clock timing information via one of (i) a multicast transmission from the reference clock via a wireless Local Area Network (LAN), (ii) a unicast transmission from the reference clock via the wireless LAN, (iii) a multicast transmission from the reference clock via a wired LAN, or (iv) a unicast transmission from the reference clock via the wired LAN; and wherein receiving two or more data streams comprises receiving each data stream of the two or more data streams via a respective one of (i) a multicast transmission via the wireless LAN, (ii) a unicast transmission via the wireless LAN, (iii) a multicast transmission via a wired LAN, or (iv) a unicast transmission via the wired LAN.

20. The tangible, non-transitory computer-readable media of claim 13, wherein the two or more data streams comprise at least two data streams selected from a set of data streams comprising (i) one or more data streams comprising music, (ii) one or more data streams comprising sound effects, and (iii) one or more data streams comprising paging content.

21. The tangible, non-transitory computer-readable media of claim 13, wherein generating a mix of the sample-rate adjusted audio content of the two or more data streams at the playback device comprises mixing the sample-rate adjusted audio content of the two or more data streams at the playback device based on mixing instructions received from a playback system coordinator separate from the playback device.

22. The tangible, non-transitory computer-readable media of claim 13, wherein the functions further comprise:

beginning to operate as a rendering playback device in the playback system, wherein operating as a rendering playback device in the playback system comprises operating as a first rendering playback device type of a plurality of rendering playback device types, wherein each rendering playback device type corresponds to a different playback role in the playback system, and wherein the plurality of rendering playback device types comprises one or more of (i) a render only playback device, (ii) a synchrony group coordinator, (iii) a synchrony group member, (iv) a home theater head end, (v) a home theater satellite, (vi) a stereo pair primary player, (vii) a stereo pair secondary player, (viii) a bonded group primary player, (ix) a bonded group secondary player, (x) a playback system coordinator, (xi) a playback system primary player, or (xii) a playback system secondary player.

23. The tangible, non-transitory computer-readable media of claim 22, wherein a particular rendering playback device type corresponds to a software application package comprising program instructions executable by the one or more processors such that the playback device is configured to operate as the particular rendering playback device type, and wherein the functions further comprise:

while executing a first software application package corresponding to the first rendering playback device type in the playback system, receiving a command to switch from operating as the first rendering playback device type to operating as a second rendering playback device type; and after receiving the command to switch from operating as the first rendering playback device type to operating as the second rendering playback device type, (i) obtaining a second software application package corresponding to the second rendering playback device type, (ii) executing the second software application package, and (iii) ceasing execution of the first software application package.

24. The tangible, non-transitory computer-readable media of claim 13, wherein an individual data stream of the two or more data streams comprises a series of frames comprising the audio content and the playback timing information for the audio content.

* * * * *